United States Patent
Sciancalepore et al.

(10) Patent No.: US 11,051,210 B2
(45) Date of Patent: Jun. 29, 2021

(54) METHOD AND SYSTEM FOR NETWORK SLICE ALLOCATION

(71) Applicant: NEC Laboratories Europe GmbH, Heidelberg (DE)

(72) Inventors: Vincenzo Sciancalepore, Heidelberg (DE); Xavier Costa Perez, Heidelberg (DE); Albert Banchs, Getafe (ES); Marco Gramaglia, Getafe (ES)

(73) Assignee: NEC LABORATORIES EUROPE GMBH, Heidelberg (DE)

(*) Notice: Subject to any disclaimer, the term of this patent is extended or adjusted under 35 U.S.C. 154(b) by 456 days.

(21) Appl. No.: 15/905,841

(22) Filed: Feb. 27, 2018

(65) Prior Publication Data
US 2018/0317133 A1 Nov. 1, 2018

Related U.S. Application Data

(60) Provisional application No. 62/491,299, filed on Apr. 28, 2017.

(51) Int. Cl.
*H04W 28/26* (2009.01)
*H04W 28/24* (2009.01)
(Continued)

(52) U.S. Cl.
CPC ........... *H04W 28/26* (2013.01); *H04W 16/02* (2013.01); *H04W 24/02* (2013.01); *H04W 28/24* (2013.01)

(58) Field of Classification Search
None
See application file for complete search history.

(56) References Cited

U.S. PATENT DOCUMENTS

| 2009/0099985 A1* | 4/2009 | Tesauro | G05B 13/0265 706/12 |
| 2012/0324072 A1* | 12/2012 | Sartini | G06F 9/50 709/223 |

(Continued)

FOREIGN PATENT DOCUMENTS

| WO | WO 2017025152 A1 | 2/2017 |
| WO | WO 2017059803 A1 | 4/2017 |

OTHER PUBLICATIONS

Fangwen Fu et al: "Stochastic Game for Wireless Network Virtualization", IEEE / ACM Transactions on Networking, IEEE / ACM, New York, NY, US, vol. 21, No. 1, Feb. 1, 2013 (Feb. 1, 2013), pp. 84-97, XP011493949.

(Continued)

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

A method of allocating network slices of a network infrastructure includes receiving a network slice request for network resources of the network infrastructure in a form of a network slice. The network slice request includes a service level agreement (SLA) and an associated payoff. It is determined whether to accept the network slice based on whether it is expected that a utility function will be better served by accepting the network slice request or waiting for a further network slice request. It is determined whether the SLA would be fulfilled prior to allocating the network slice. The network slice is allocated and installed in the network infrastructure. Whether the utility function is better served can be determined using a value iteration algorithm or an adaptive algorithm.

17 Claims, 14 Drawing Sheets

(51) Int. Cl.
*H04W 24/02* (2009.01)
*H04W 16/02* (2009.01)

(56) References Cited

U.S. PATENT DOCUMENTS

| | | | | |
|---|---|---|---|---|
| 2016/0156513 | A1* | 6/2016 | Zhang | H04L 41/00 709/220 |
| 2016/0212017 | A1* | 7/2016 | Li | H04L 67/18 |
| 2016/0352645 | A1* | 12/2016 | Senarath | H04L 43/0876 |
| 2017/0093748 | A1* | 3/2017 | Kallin | H04L 41/5025 |
| 2017/0104688 | A1* | 4/2017 | Mirahsan | H04L 12/4641 |
| 2017/0318468 | A1* | 11/2017 | Aijaz | H04W 16/10 |
| 2017/0332226 | A1* | 11/2017 | Bharatia | H04W 76/10 |
| 2018/0077179 | A1* | 3/2018 | Zhang | H04L 63/1441 |
| 2018/0123878 | A1* | 5/2018 | Li | H04L 41/5041 |
| 2018/0132117 | A1* | 5/2018 | Senarath | H04L 43/04 |
| 2018/0152958 | A1* | 5/2018 | Arnold | H04L 41/5009 |
| 2018/0220276 | A1* | 8/2018 | Senarath | H04L 12/1403 |
| 2018/0227768 | A1* | 8/2018 | Samdanis | H04W 16/14 |
| 2019/0028249 | A1* | 1/2019 | Rost | H04L 5/0037 |
| 2019/0123963 | A1* | 4/2019 | Tang | H04L 45/64 |

OTHER PUBLICATIONS

Samdanis Konstantinos et al: "From network sharing to multi-tenancy: The 5G network slice broker", IEEE Communications Magazine, IEEE Service Center, Piscataway, US, vol. 54, No. 7, Jul. 1, 2016 (Jul. 1, 2016), pp. 32-39, XP011617038.

NGMN Alliance, "NGMN 5G P1 Requirements & Architecture Work Stream End-to-End Architecture; Description of Network Slicing Concept", NGMN 5G Project Requirements & Architecture—Work Stream E2E Architecture, version 1.0, Jan. 13, 2016, pp. 1-7.

3GPP TR 23.799 V14.0.0 (Dec. 2016), "$3^{rd}$ Generation Partnership Project; Technical specification Group Services and System Aspects; Study on Architecture for Next Generation System (Release 14)", Dec. 2016, pp. 1-522.

NGMN Alliance, "A Deliverable by the NGMN Alliance; NGMN 5G White Paper" Feb. 17, 2015, pp. 1-125.

Xuan Zhou, et al., "Network Slicing as a Service: Enabling Enterprises' Own Software-Defined Cellular Networks", IEEE Communications Magazine, Jul. 2016, pp. 146-153.

Konstantinos Samdanis, et al., "From Network Sharing to Multi-tenancy: The 5G Network Slice Broker", Feb. 2015, pp. 1-11.

Sachin Katti, et al., "RadioVisor: A Slicing Plane for Radio Access Networks", Aug. 2014, pp. 1-2.

Ilaria Malanchini, et al., "Generalized Resource Sharinf for Multiple Operators in Cellular Wireless Networks", Proceedings of IEEE IWCMC, Aug. 2014, pp. 1-6.

Rajesh Mahindra, et al., "Radio Access Network Sharing in Cellular Networks", Proceedings of ICNP, Oct. 2013, pp. 1-10.

Saravana Rathinakumar, et al., "GAVEL: Strategy-Proof Ascending Bid Auction for Dynamic Licensed Shared Access", MobiHoc '16, Jul. 4-8, 2016, pp. 1-10.

Dusit Niyato, et al., "Competitive Pricing in Heterogeneous Wireless Access Networks: Issues and Approaches", IEEE Network, Nov. 2008, pp. 1-8.

3GPP TS 23.501 V0.4.0 (Apr. 2017), $3^{rd}$ Generation Partnership Project; Technical Specification Group Services and System Aspects; System Architecture for the 5G System; Stage 2 (Release 15), Apr. 2017, pp. 1-124.

Richard Bellman, "A Markovian Decision Process", DTIC, Tech. Rep., Oct. 1957, pp. 1-15.

Christopher Watkins, et al., "Technical Note: Q-Learning", Machine Learning vol. 8, No. 3-4, Dec. 1992, pp. 1-15.

* cited by examiner

METHOD AND SYSTEM FOR NETWORK SLICE ALLOCATION

CROSS-REFERENCE TO PRIOR APPLICATION

Priority is claimed to U.S. Provisional Patent Application No. 62/491,299, filed on Apr. 28, 2017, the entire disclosure of which is hereby incorporated by reference herein.

STATEMENT REGARDING SPONSORED RESEARCH OR DEVELOPMENT

The work leading to this invention has received funding from the European Union's Horizon 2020 Programme under grant agreement n° 671584.

FIELD

The invention relates to a method and system for efficient network slice allocation, e.g., in a 5G network.

The invention relates to a novel interaction between tenants and infrastructure providers. In particular, a method and system are provided for dynamically and online evaluating network slices requests defined by their SLA requirements and associated payoff. Embodiments of the invention jointly consider SLA requirements and payoffs to maximize a utility function, e.g., overall network resource utilization.

BACKGROUND

Network virtualization and softwarization concepts have represented a turning point in the cellular network design. Conventional network components can be easily combined and placed dynamically to be tailored specific service requirements. This makes it possible for network operators to create on-demand isolated and efficient end-to-end (virtualized) networks fully (or partially) dedicated to their customers and results in a new paradigm, namely network slicing, where the overall network architecture is envisioned as a big pool in which network resources and functions are efficiently chained into a "network slice" and assigned to a network infrastructure tenant.

The network slicing concept has only been proposed recently in NGMN Alliance, "Description of network slicing concept," NGMN 5G P1 (January 2016), which is hereby incorporated by reference herein, but, it has already attracted substantial attention. As discussed in 3GPP, "Study on Architecture for Next Generation System," TR 23.799, v2.0.0 (December 2016), which is also hereby incorporated by reference herein, 3GPP has started working on the definition of requirements for network slicing, whereas NGMN identified network sharing among slices as one of the key issues to be addressed (see NGMN Alliance, "5G White Paper," White Paper (February 2015), also hereby incorporated by reference herein). Despite these efforts, most of the work has focused on architectural aspects with only a limited focus on resource allocation algorithms (see X. Zhou, R. Li, T. Chen, and H. Zhang, "Network slicing as a service: enabling enterprises' own software-defined cellular networks," IEEE Communications Magazine, vol. 54, no. 7, pp. 146-153 (July 2016) and K. Samdanis, X. Costa-Perez, and V. Sciancalepore, "From network sharing to multi-tenancy: The 5G network slice broker," IEEE Communications Magazine, vol. 54, no. 7, pp. 32-39 (July 2016), each of which are hereby incorporated by reference herein). While there is a body of work related to a spectrum sharing concept (see, e.g., A. Gudipati, L. Li, and S. Katti, "Radio-Visor: A Slicing Plane for Radio Access Networks," in Proc. of ACM HotSDN (August 2014); I. Malanchini, S. Valentin, and O. Aydin, "Generalized resource sharing for multiple operators in cellular wireless networks," in Proc. of IEEE IWCMC (August 2014), R. Mahindra, M. A. Khojastepour, H. Zhang, and S. Rangarajan, "Radio Access Network sharing in cellular networks," in Proc. of IEEE ICNP (October 2013); and S. Rathinakumar and M. Marina, "GAVEL: Strategy-proof Ascending Bid Auction for Dynamic Licensed Shared Access," in Proc. of ACM Mobi-Hoc, (July 2016), each of which is hereby incorporated by reference herein), these proposals are not tailored to the specific requirements of the 5G ecosystem. D. Niyato and E. Hossain, "Competitive Pricing in Heterogeneous Wireless Access Networks: Issues and Approaches", IEEE Network (November 2008), hereby incorporated by reference herein, present an overview about pricing models and game-theory approaches in wireless networks. Infrastructure as a Service (IaaS) providers such as Amazon Web Services or Microsoft Azure sell their computational resources such as CPU, disk or memory for Virtual Network Function (VNF) purposes.

SUMMARY

In an embodiment, the present invention provides a method of allocating network slices of a network infrastructure. A network slice request is received for network resources of the network infrastructure in a form of a network slice. The network slice request includes a service level agreement (SLA) and an associated payoff. It is determined whether to accept the network slice based on whether it is expected that a utility function will be better served by accepting the network slice request or waiting for a further network slice request. It is determined whether the SLA would be fulfilled prior to allocating the network slice. The network slice is allocated and installed in the network infrastructure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
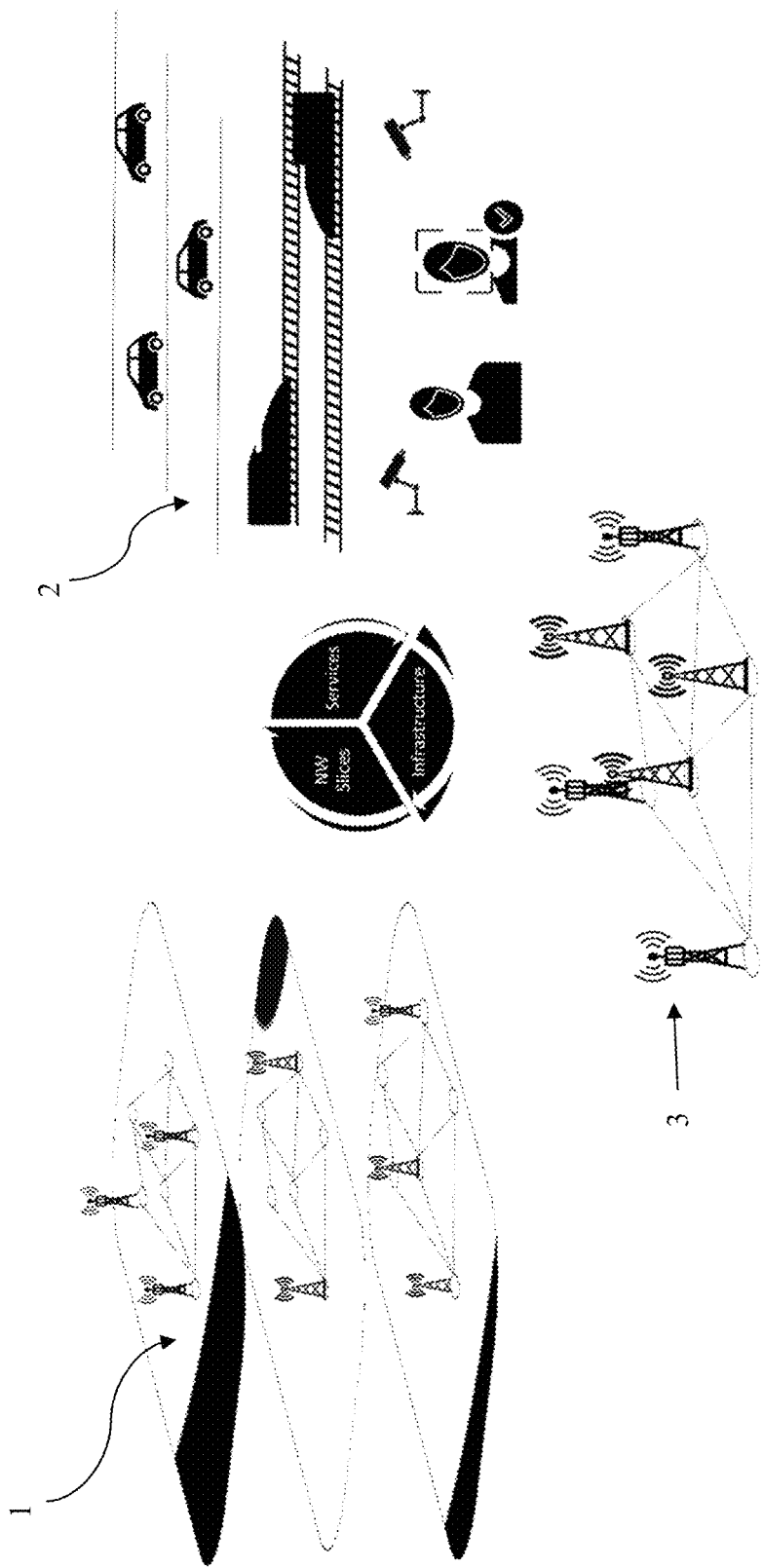
FIG. 1 schematically shows a 5G network infrastructure implementing network slicing.

Embodiments of the present invention solve problems unique to cellular networks, and especially 5G networks, such as how to allocate network slices in view of heterogeneous requirements. As conceptually illustrated in FIG. 1, network slices 1 allow for a role separation between infrastructure providers (the ones who provide computational and network resources used by different network slices) and network slice tenants (the ones acquiring a slice to orchestrate and run network functions within that slice to provide a certain service to their customers). This model is further enriched as the set of potential tenants introduces new players into the ecosystem, such as mobile virtual network operators (MVNOs), third party applications and vertical market segments. With network slicing, different services 2 (such as, e.g., automotive, mobile broadband or haptic Internet) can be provided by different network slice instances. Each of these instances consists of a set of virtual network functions that run on the same infrastructure 5 with a tailored orchestration. In this way, very heterogeneous requirements can be provided by the same infrastructure, as different network slice instances can be orchestrated and configured according to their specific requirements. Additionally, this can be performed in an efficient manner, as different network slice tenants dynamically sharing the same infrastructure may pay off differently according to their network slice Service Level Agreements (SLAs).

Providing network resources is an intrinsically different problem than the IaaS approach because of the following problems unique to the provision of network resources in the networks:

- spectrum is a scarce resource for which over-provisioning is not possible;
- the actual capacity of the system (i.e., the resources that can actually be sold) heavily depends on the users' characteristics; and
- the SLAs with network slices tenants usually impose stringent requirements on the Quality of Experience (QoE) perceived by their users.

Therefore, in contrast to IaaS, applying a strategy where all the requests coming to the infrastructure provider are admitted is not feasible.

The new 5G ecosystem allows for novel solutions for the allocation of the (scarce) network resources among tenants; this is the so-called spectrum market. Limited network resources translate into a cost-efficient negotiation between producer and customers: resources may be sold at bargain rates. However, estimating the right payoff for requested resources and automatically evaluating whether the offer is acceptable may result in revenue loss for the infrastructure provider and inefficient resource allocation. For example, a network infrastructure provider has only Y resources available for the next T seconds and receives network slice request with payoff X occupying Y for the next T seconds. With the resources available, this request can be accepted. However, this automatically prevents the infrastructure provider from selling the same Y resources to the next tenant, which may potentially offer a higher payoff (e.g., X+1) for the same T time period. On the other hand, if the infrastructure provider rejects the request, but does not receive any better request during the T time period, the occupation of the network resources (and the corresponding gain) will be delayed, negatively effecting the overall network resource utilization. The latter may indeed occur where the infrastructure provider incorrectly calculates an expected payoff for certain resources and rejects any network slice request providing less than expected revenues. This delays the resource occupation (and the corresponding gain), thereby negatively affecting the overall utilization of network resources and revenue. To address this problem, embodiments of the present invention provide a technological solution to automatically retrieve network slice requests with corresponding payoffs and decide (on-line) whether to accept or reject them.

Figure 2:
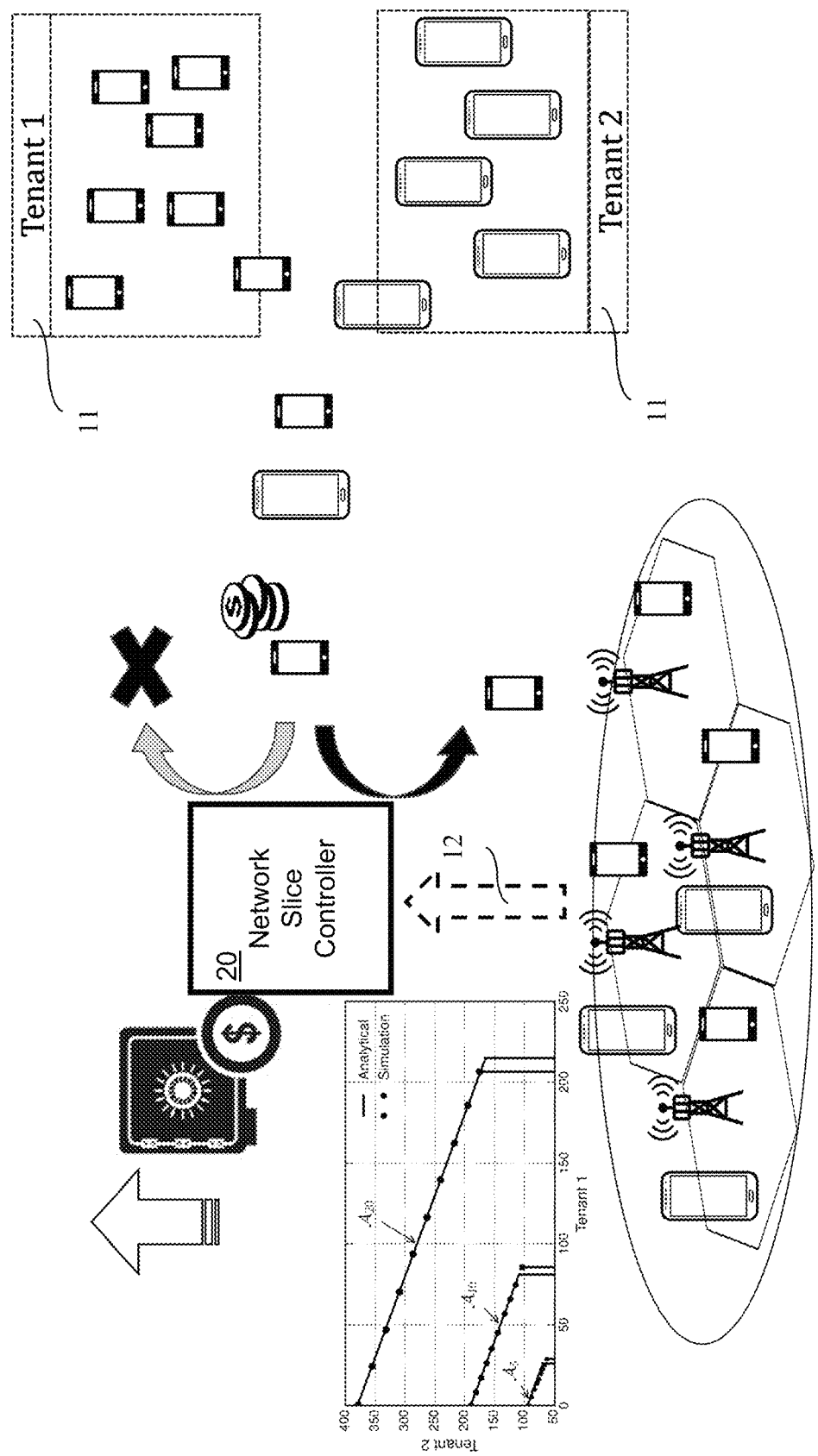
FIG. 2 schematically shows a network slice controller within a network infrastructure implementing a method for network slice allocation according to an embodiment of the present invention.

Embodiments of the present invention provide for communications between the infrastructure provider and the network slice tenant in 5G ecosystems for allocating and provision network slices in a flexible and efficient manner. In particular, as schematically illustrated in FIG. 2, a networked computer system 10 is provided where the network slice tenant 11 can directly issue network slice requests 12 providing a potential payoff for getting and using network resources for a given amount of time. This automated computer system 10 is driven by a network slice controller 20, which is a server and/or one or more computational processors having access to volatile and/or non-volatile memory for executing the methods according to embodiments of the invention, in charge of (i) evaluating in real-time the network slice requests 12 coming into the network and (ii) accepting/rejecting them to maximize a utility function while satisfying the service guarantees provided to the network slices. The utility function can be, for example, maximizing overall network resource usage or maximizing the revenue of individual network infrastructure providers.

Regardless of the selected utility function, embodiments of the present invention provide further improvements to the network. For example, by learning which network slices are better to accept now, the network slice controller is able to accept and service more network slice requests overall and meet the network slice requests in a more timely manner. Further, by taking into consideration the different SLAs, embodiments of the present invention provide for more flexibility in accepting and servicing different types of SLAs, having different levels of requirements and associated payoffs. Moreover, maximizing revenue of individual network infrastructure providers will result in increased overall network resource usage, and vice versa.

For example, in a simple case, consider a network infrastructure provider who has Y resources available for a time period T, and receives a first network slice request for Z resources, where Z<Y. Prior to the present invention, such a network infrastructure provider might decide to accept the request because it has sufficient resources to service the request. In contrast, in accordance with embodiments of the present invention, the network infrastructure provider could decide it is better to wait for a second network slice request for Y resources having a better payoff. In this case, the first network slice request could have been serviced by a network infrastructure provider having Z resources available for the time period T, thereby more efficiently allocating and utilizing the available network resources in the network.

Network slice requests might indicate particular settings after choosing the best network slice characteristics amongst available network slice templates (NSTs), for example, stored in a physical memory 22 of the network slice controller 20. Such NSTs are fixed and decided on by the infrastructure provider and comprises a set of requirements (SLAs) to be fulfilled. Once the network slice is admitted, the network slice controller 20 automatically selects the NST to be used for instantiating the requested network slice.

The network slice controller 20 should first check whether the network slice request (with its associated SLA) fits in the network capacity, e.g., it should perform an admission control process, to guarantee SLAs for the already admitted (running) network slices. As shown in the exemplary FIG. 2, an admissibility region is used to automatically check whether a new network slice request 12 may be accommodated given the current network resources utilization. In particular, three different admissibility regions A are depicted as examples of three different NSTs (with different throughput requirements, e.g., $A_5$ represents network slice requests asking for throughput equal to the total system capacity divided by 5).

External advanced additional admission control can be triggered to check the resource availability. In case of resource scarcity, the network slice controller 20 can propagate a modified slice request, which can be accommodated. When accepted, the network slice controller 20 instantiates a network slice applying the proper NST, for example, through a network orchestrator. In case of network slice request rejection, the network slice tenant 11 is not prevented to send another network slice request in the future (maybe with a different payoff).

Figure 3:
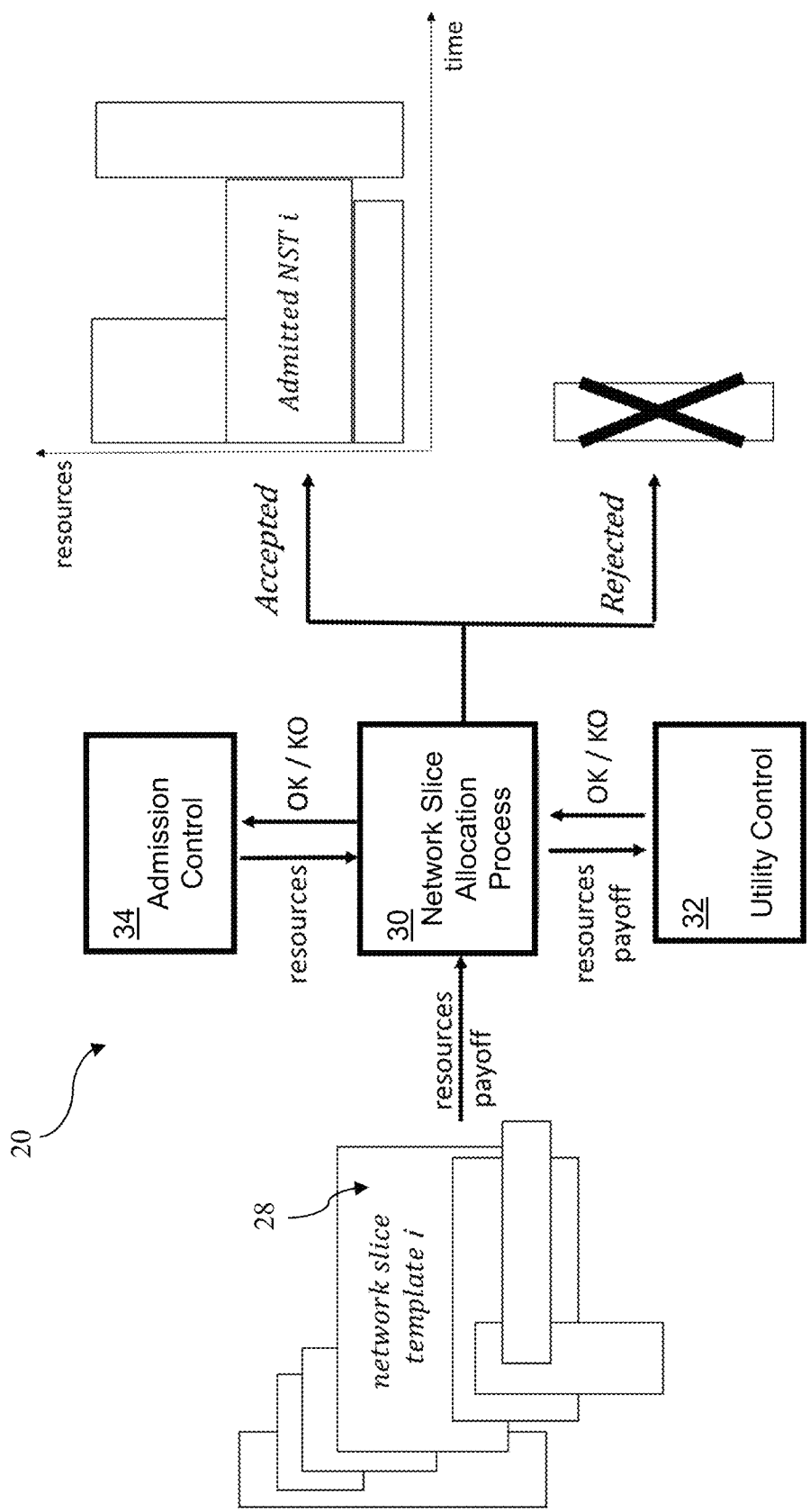
FIG. 3 schematically shows system architecture blocks for implementing the method for network slice allocation according to an embodiment of the present invention.

An example system model architecture for the network slice controller 20 is shown in FIG. 3. The network slice allocation process 30 directly and automatically interacts with the utility control block 32, in charge of deciding (online) whether it is better to accept the current network slice request or reject it and wait for additional network slice requests with a higher payoff. This blocks aims at maximizing the utility function, e.g., total network resource utilization or overall revenue. On the other side, the network slice allocation process might be helped by an admission control block 34, which might pursue the system resource utilization maximization.

When an infrastructure tenant issues a network slice request, it can be chosen within the available set of NSTs 28 based on certain requirements. The NST 28 might comprise the following SLA requirements: i) a certain amount of Physical Resource Blocks (PRBs), ii) a certain throughput level, expressed as mean value or peak value (Mb/s), iii) the traffic type, e.g., mission critical, best-effort and so on, and iv) a certain level of admitted end-to-end delay (seconds).

This network slice request 12 might be envisioned as follows:

slice_request (id, SLA_param, duration, payoff)

The request 12 is processed and different requests can be issued to the admission control block 34 and to the utility control block 32, as follows:

| sender | recipient | message |
| --- | --- | --- |
| Network Slice Allocation Process 30 | Admission Control 34 | admission_request (id, SLA_param, duration) |
| Admission Control 34 | Network Slice Allocation Process 30 | OK or KO |
| Network Slice Allocation Process 30 | Utility Control 32 | revenue request (id, SLA_param, duration, payoff) |
| Utility Control 32 | Network Slice Allocation Process 30 | OK or KO |

Messages to the admission control block 34 and the utility control block 32 can be issued simultaneously. The network slice allocation process 30 can further decide to issue additional admission_request by changing the SLA_param value in order to check the availability for admitting slightly different network slice requests and offer this option to the infrastructure tenant 11.

Once the response is retrieved, the network slice allocation process 30 takes the decision and notifies the infrastructure tenant 11. Eventually, a rejection notification may include other options (modified SLA requirements) for being admitted into the system. If the network slice request is rejected, the tenant is not prevented from issuing an additional network slice request in the future.

Figure 4:
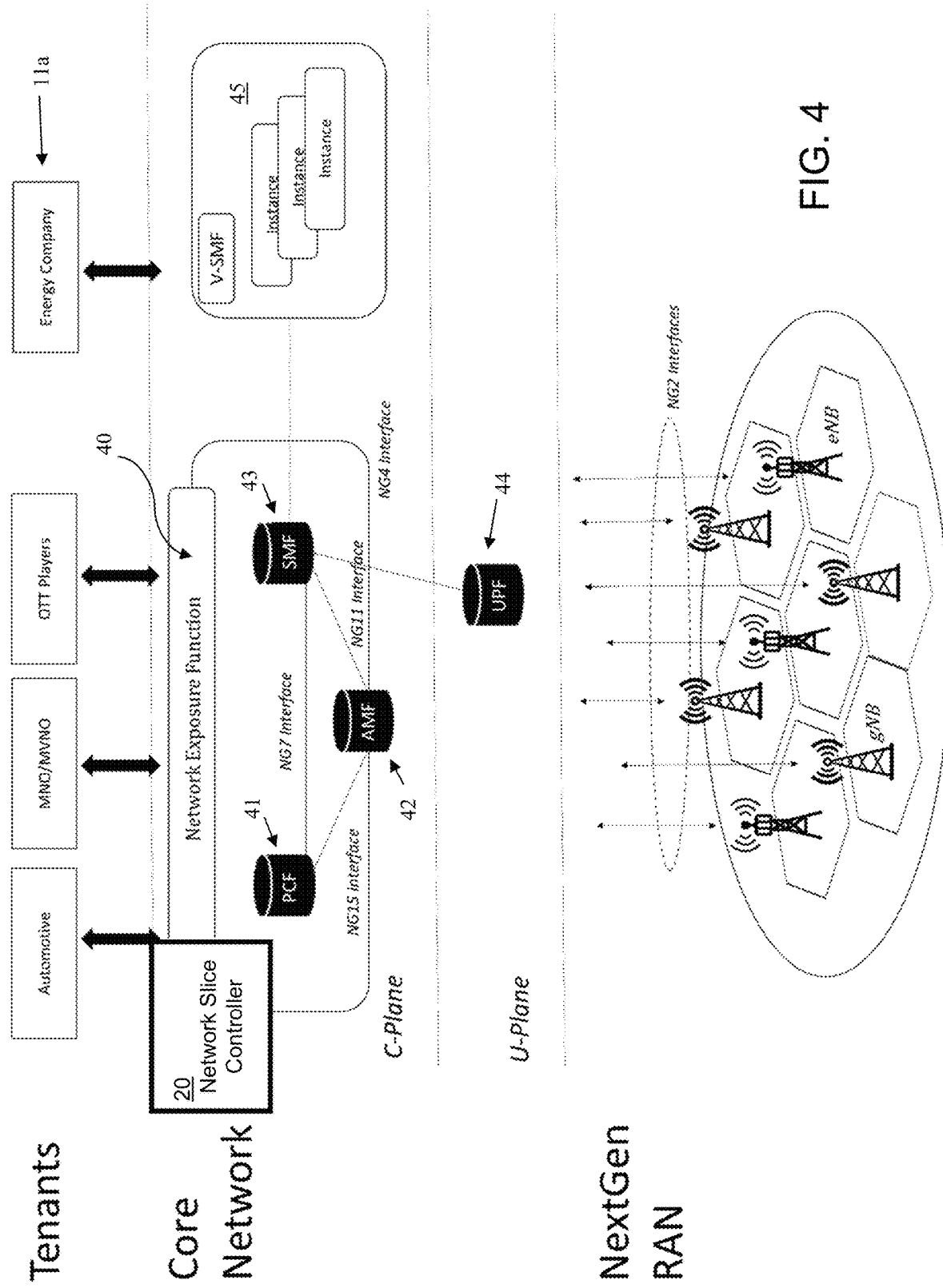
FIG. 4 schematically shows an embodiment of the network slice controller in a 3GPP-compliant 5G architecture.

3GPP-Compliant Architecture:

According to an embodiment schematically shown in FIG. 4, the network slice allocation process 30 is embodied as an independent functional block in the 3GPP standard mobile architecture. In order to do so, the concept of network exposure function (NEF), as discussed in 3GPP, "Study on Architecture for the 5G System," TS 23.501, v0.3.1 (March 2017), which is hereby incorporated by reference herein, is relied on. Such a NEF component 40 provides a means to expose the services and capabilities provided by the network functions. In this case, it exposes the availability of the network to accept network slice requests coming from tenant applications 11a. The NEF component 40 also receives information from other network functions. It can store the received information as structured data by using a standardized interface to a data storage network function. The stored information can be used and exposed by the NEF to other network functions and used for other purposes. The network slice allocation process 30 then can be a block attached directly to the NEF component 40. Specifically, FIG. 4 shows the expected architectural structure of the 5G mobile network, as defined by 3GPP SA2. The NEF component 40 can be used to expose a list of available NSTs defining specific functions to be instantiated for given service requirements or SLAs. Network slice requests coming through the NP8 interface will then indicate the requested NST based on the available ones as well as the amount of revenue for getting such a NST. The NEF component 40 forwards such information to the network slice controller 20, which, based on the mechanisms described in FIG. 3, notifies the NEF component 40 with a successful response (i.e., the network slice request can be admitted into the network) or a negative response (i.e., the network slice request cannot be admitted into the network and/or could be modified accordingly in order to be admitted). Once the network slice controller 20 decides to admit an incoming network slice request, the NEF component 40 notifies the tenant and also issues the NST associated to the network slice request to the rest of the mobile network, using standardized interfaces. Once a network slice request is admitted, a Network Slice Selection Assistance Information (NSSAI) indicator is propagated through all network components and advertised to incoming user equipment (UEs) through the radio access network (RAN) messages. Based on the NSSAI, the access and mobility function (AMF) 42 will select the session management function (SMF) 43 and a network slice will be successfully installed. Associated UEs might then indicate in the radio resource control (RRC) signaling the NSSAI to be used for serving its traffic. A virtual-SMF (V-SMF) 44, a policy control function (PCF) 41 and a user plane function (UPF) 44 are connected to the SMF 43. While this embodiment utilizing the NEF is particularly advantageous and suitable in 3GPP RAN3 standards and SA2 architecture, other embodiments can be applied in other network slice installation procedures.

EMBODIMENTS

The present invention provides different embodiments for the intelligence and technical solution of the utility control functional block 32 of FIG. 3, as described in the following.

Embodiment 1

When the network is close to congestion, admitting a request that provides a lower revenue may prevent the infrastructure provider from admitting a future request with a higher revenue associated. Therefore, the infrastructure provider may be better off by rejecting the first request with the hope that a more profitable one will arrive in the future.

In this embodiment, an optimal revenue admission policy is derived that maximizes the utility function, e.g., the revenue of the infrastructure provider, and is implemented in the utility control functional block 32. An analysis of the revenue obtained by the infrastructure provider is presented as a function of the admission policy, and then this analysis is built upon to find the optimal admission policy.

To analyze the revenue obtained by the infrastructure provider, the system is modeled as a Semi-Markov Decision Process (SMDP). For ease of explanation, two types of SLAs are considered (namely, i) elastic, which guarantees and average throughput, and ii) inelastic, which guarantees an instantaneous throughput) and the system is modeled for the case in which there are only two tenants requesting network slice, for one elastic user or for one inelastic user.

The Markov Decision Process theory models a system as: i) a set of states s, ii) a set of actions a, iii) a transition function P (s; a; s'), iv) a time transition function T (s; a), and (v) a reward function R (s; a), see R. Bellman, "A markovian decision process," DTIC, Tech. Rep. (1957), which is hereby incorporated by reference herein. At each event, the system can be influenced by taking one of the possible actions a. According to the chosen actions, the system earns the associated reward function R (s; a), the next state is decided by P (s; a; s') while the transition time is defined by T (s; a).

Figure 5:
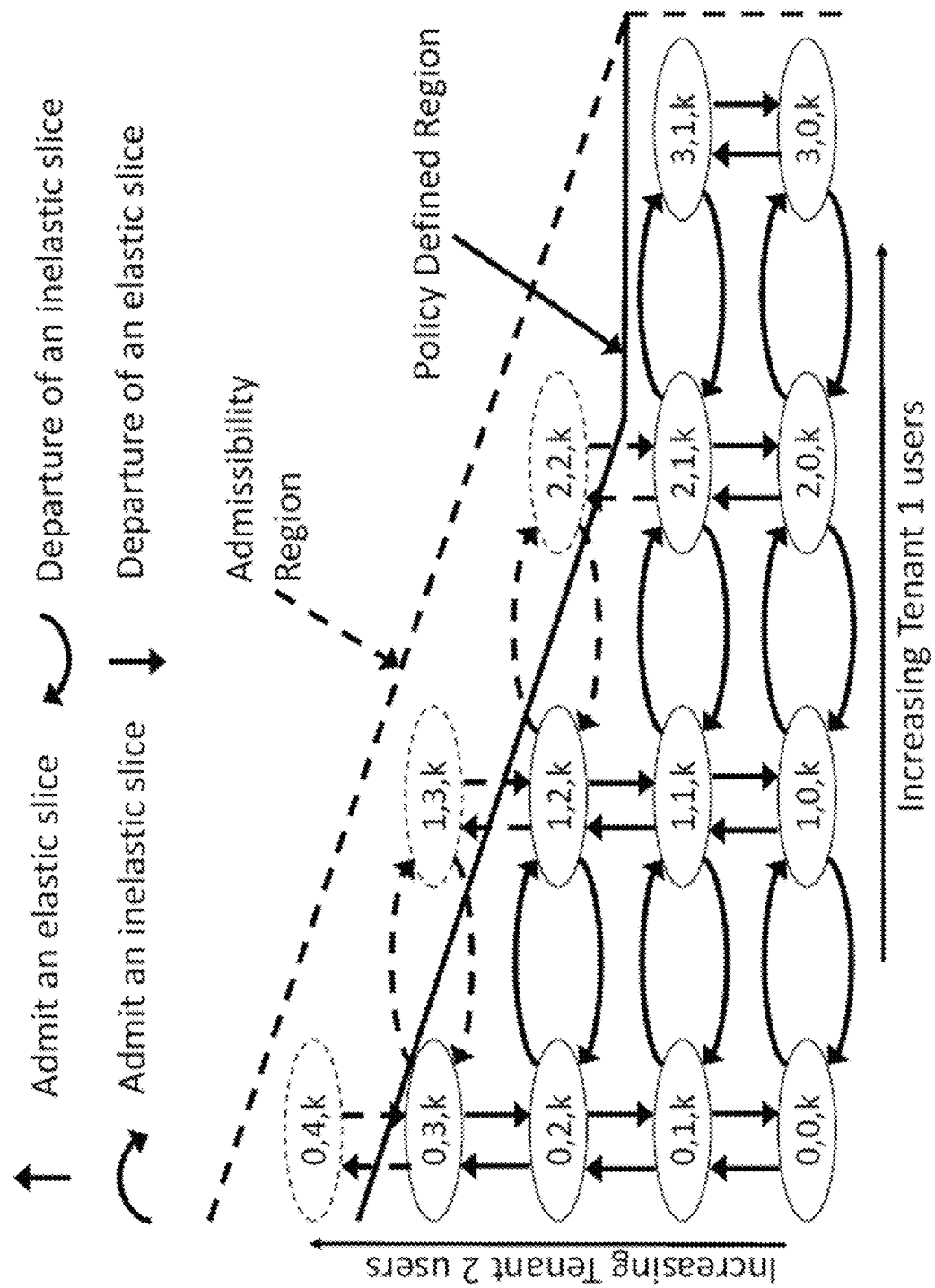
FIG. 5 graphically shows operation of an exemplary system modelled with a Semi-Markov Decision Process according to an embodiment of the present invention.

When admitted into the system, the slices occupy the system resources according to an exponentially distributed time and generate a revenue per time unit for the infrastructure provider of $r_i$ and $r_e$. That is, the total revenue r generated by an, e.g., elastic request with duration t is t $r_e$. The space state S is then defined as follows: a state s is a three-sized tuple $(n_i; n_e; k)$ where $n_i$ and $n_e$ are the number of inelastic and elastic slices in the system at a given decision time t, and k is the next event that triggers a decision process. This can be either a new arrival of a network slice request for inelastic and elastic slices (k=i and k=e, respectively), or a departure of a network slice of any kind that left the system (k=d). In the latter case, $n_i$ and $n_e$ represent the number of inelastic and elastic slices in the system after the departure. FIG. 5 shows how the space state S relates to the admissibility region A. In FIG. 5, a subset of the space state S is shown. The entire space state S is the one collecting all possible states (T1, T2, k), where T1 is the total number of tenant1 users and T2 is the total number of tenant 2 users. The dashed line delimits the admissibility region A. In that region, only a subset of all possible states (S) are included. The possible actions a are the following: a=G or D. The action G corresponds to admitting the new request of an elastic or inelastic slice; in this case, the resources associated with the request are granted to the tenant and the revenue $r=r_{i,e}$ t is immediately earned by the infrastructure provider.

In contrast, action D corresponds to rejecting the new request; in this case, there is no immediate reward, but the resources remain free for future requests. Note that upon a departure (k=d), the system is forced to a fictitious action D that involves no revenue. Furthermore, it is forced that upon reaching a state in the boundary of the admissibility region (based on trivial or advanced admission control policies through the admission control functional block), the only available action is to reject an incoming request (a=D) as otherwise the committed SLA guarantees would not be met.

A policy π(S) is defined as a mapping from each state s to an action a. Thus, the policy determines whether, for a given number of elastic and inelastic slices in the system, a new request of an elastic or an inelastic slice should be admitted. With the SMDP described above, the probability of staying at each of the possible states can therefore be computed. Then, the long term average revenue R obtained by the infrastructure provider can be computed as the following: $R=P(n_i; n_e; k)(n_i r_i + n_e r_e)$ where $r_i$ and $r_e$ are the payoff per time unit paid by an inelastic and an elastic network slice, respectively.

According to an embodiment, therefore, is possible to find a policy π(S) that maximizes the long term average revenue as the utility function.

An embodiment of the present invention builds upon value iteration (see R. Howard, "Dynamic Programming and Markov Processes," Technology Press-Wiley (1960), which is hereby incorporated by reference herein), which is an iterative approach to find the optimal policy that maximizes the average revenue of the system. Based on the SMDP, the transition probabilities P (s,a,s') can be derived. Then, the value iteration algorithm is applied for SMDP. In order to apply value iteration to the system according to an embodiment of the present invention, an additional step is needed: all the transition times need to be normalized as multiples of a faster, arbitrary, fixed transition time t. The only constraint that has to be satisfied by t is that it has to be faster than any other transition time in the system.

Figure 6:
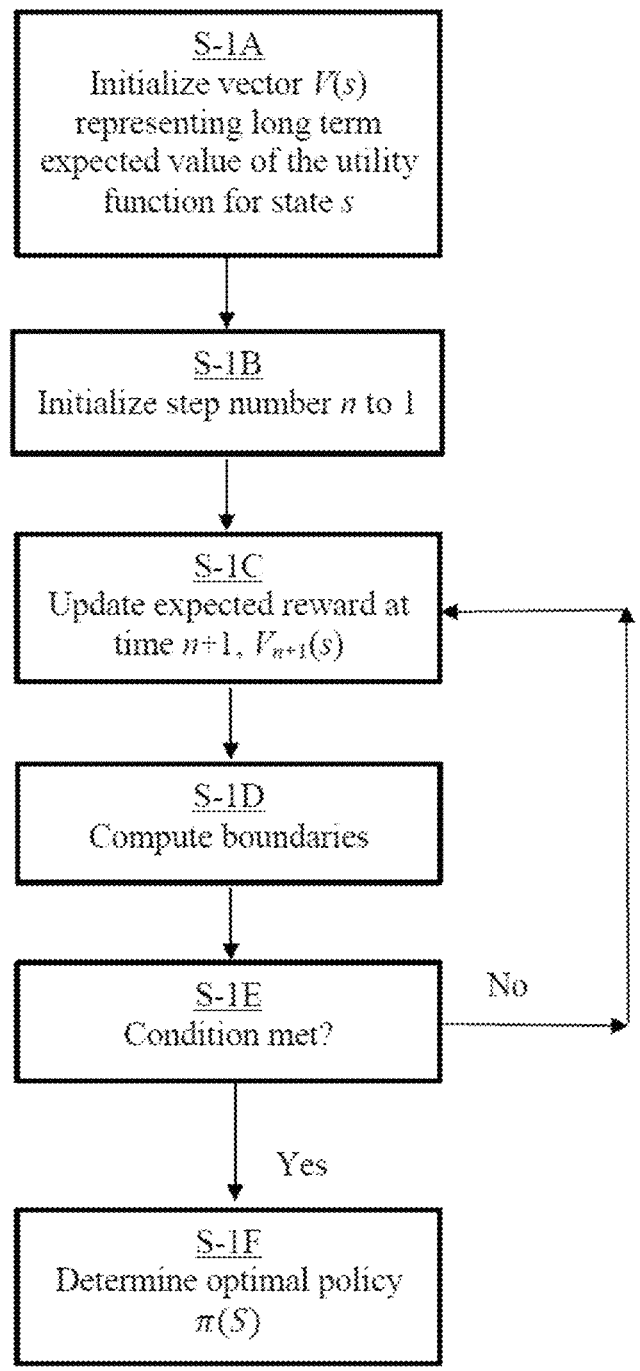
FIG. 6 illustrates the steps of a value iteration algorithm according to an embodiment of the present invention.

With the above normalization, the continuous time SMDP corresponding to the analysis described above becomes a discrete time Markov Process and the modified value iteration algorithm may be used to devise the best policy π(S), as shown in FIG. 6. The discretised Markov Chain will hence be composed of transitions (at interval of t) that may correspond to transitions in continuous time system or not.

FIG. 5 shows an example of system modeled with SMDP. The value iteration algorithm is guaranteed to find the optimal policy π(S). Such an optimal policy is illustrated in FIG. 5 for the case where the payoff of inelastic slice (tenant 1) is higher than that of elastic slice (tenant 2). FIG. 5 shows those states for which the corresponding action is to admit the new request (straight line), and those for which it is to reject it (dashed lines). It can be observed that while some of the states with a certain number of elastic slices fall into the admissibility region, the system is better off rejecting those requests and waiting for future (more rewarding) requests of tenant 1 slice. In contrast, tenant 1 slice requests are always admitted (within the admissibility region).

Embodiment 2

The value iteration algorithm described above provides an optimal policy for revenue maximization. This is very useful and also provides a benchmark for comparison. However, the algorithm itself can have a relatively high computational cost. According to another embodiment, an adaptive algorithm is designed in the utility control block and aims at maximizing revenue by learning from outcomes resulting from the previous decisions. In contrast to the value iteration algorithm, the adaptive algorithm is executed step-by-step while taking admission control decisions, and hence does not require high computational resources.

According to an embodiment, the adaptive algorithm is based on a Q-Learning framework (see C. Watkins and P. Dayan, "Q-learning," Machine learning, vol. 8, no. 3-4, pp. 279-292 (1992), which is hereby incorporated by reference herein). Q-Learning is a machine learning framework for designing adaptive algorithms in SMDP-based systems. It works by taking decisions that move the system to different states within the SMDP state-space and observing the outcome. Thus, it leverages the "exploration vs. exploitation" principle: the algorithm learns by visiting unvisited states and takes the optimal decision when dealing with already visited ones.

Q-Learning provides two key advantages as compared to a value iteration framework: i) the resulting algorithm is model-free: Indeed, it makes no assumptions on the underlying stochastic processes, but rather learns by observing the events that take place in the system; ii) it is an online algorithm. The algorithm constantly learns the characteristics of the system by exploring it and taking decisions. With Q-Learning, departures in the space state can be avoided since no decision is taken upon departures. Similarly, it is not necessary to include the states in the boundary of the admissibility region. In such states, there is no option other than rejecting any incoming request, and hence no decisions need to be taken in these states either. Furthermore, the system is not sampled, as all transitions are triggered by an arrival event and the subsequent decision a.

The Q-Learning framework is formulated as follows: let Q (s; a) denote the expected reward resulting from taking an action a at a certain state s. The system keeps memory for each state of Q (s; a). It starts with empty $Q_0$ (s; a) and at the decision step n it takes an action a based on the past estimations of Q (s; a). Hence, the system experiences a transition from state s at the decision step n, to state so at decision step n+1. Then, once in step n+1, the algorithm has observed both the reward obtained during the transition R (s; a) and a sample to of the transition time. The algorithm updates the Q (s; a) involved in the decision process at step n using the newly gathered reward and transition time information. After a learning phase, the optimal admission policy at a certain state will be the one that maximizes the utility function, e.g., resulting expected revenue.

Figure 7:
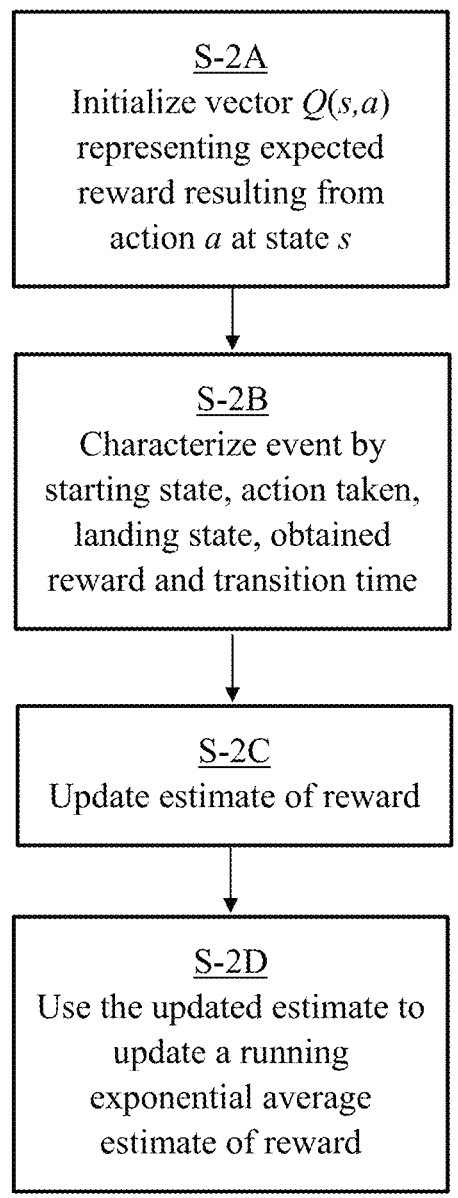
FIG. 7 illustrates the steps of a Q-learning update procedure in accordance with another embodiment of the present invention.

FIG. 7 shows a Q-Learning update procedure. The algorithm maintains the Q-values which are updated iteratively following a sample-based approach as described in FIG. 7, in which new events are evaluated at the time when they happen. In addition to the procedure to update the Q-values described in Algorithm 2, the Q-Learning algorithm also relies on two other procedures: the "temporal difference (TD)-learning" and "exploration-exploitation" procedures. The former ensures the convergence of the algorithm by employing the $\alpha$ parameter, which is the learning rate. The Q-values update process in step 4 of the Q-Learning update procedure needs to build a correct estimation of the expected revenue obtained by choosing an action a while in state s. Too slowly descending a sequences will delay the convergence of the algorithm, but too fast ones may make the algorithm unaware of new choices too soon. The latter drives the selection of the best action to be taken at each time step. While choosing the action a that maximizes the revenue at each step contributes to maximizing the overall revenue (i.e., exploitation step), it is also necessary to visit new (still unknown) states even if this may lead to a suboptimal revenue (i.e., exploration step). The reason for this is that the algorithm needs to explore all possible (s; a) options in order to evaluate the impact of the different decisions. The trade-off between exploitation and exploration is regulated by the $\gamma$ parameter. The probability of taking wrong choices decreases as the an values become smaller, up to the point where no wrong decisions are taken any more, once the algorithm already visited all states a number of times sufficiently large to learn the best Q-value.

Advantages of embodiments of the present invention include:
1) A network slice allocation process which interacts with infrastructure tenants and jointly takes into account the network slice SLAs and associated payoffs;
2) A control mechanism which takes online joint decisions on slice admission/rejection actions based on compound expected resource utilization and corresponding payoffs;
3) A network slice allocation process which, depending on the overall achievable network resource utilization or revenue might prioritize in specific cases admitting lower payoff slice requests instead of higher ones due to their improved SLA multiplexing properties (e.g. elastic traffic).

According to an embodiment, a method is provided for network slice admission control jointly considering SLA requirements and associated payoffs, the method comprising:
1) A slice allocation process receiving/retrieving network slice requests with their corresponding payoffs and SLAs;
2) A slice allocation process deciding online whether to accept or reject the network slice requests pursuing the overall system utility function maximization, with advanced mechanisms based on models and past information regarding previous payoffs and resource utilization for similar SLA requirements;
3) A slice allocation process which interacts with slicing admission control policies to check whether other constraints (resources, SLAs) can be fulfilled before allocating a network slice;
4) A slice brokering process compliant with the current 3GPP SA2 mobile network architecture, relying on the novel concept of NEF as means to interact and exchange information with tenants.
5) A slice brokering functional block installing new network slices in the infrastructure upon accepting network slice requests.

In the following, further information is provided in the context of maximizing revenue as the utility function. However, it is noted, as discussed above, that when maximizing revenue as the utility function according to an embodiment, the present invention also effects a number of technological improvements to the network. For example, by learning which network slices are better to accept now to gain the most payoff, the network slice controller is able to accept and service more network slice requests overall and meet the network slice requests in a more timely manner. In particular, by seeking to maximize revenue, greater flexibility in accepting and servicing elastic or inelastic slices is provided. Especially, inelastic slices will be accepted more often and more quickly by providing a higher payoff, allowing for more inelastic slices overall. Further, by taking into consideration the different SLAs and associated payoffs, embodiments of the present invention provide for more flexibility in accepting and servicing the different types of SLAs, having different levels of requirements and associated payoffs.

According to a system model, there are the following players: (i) the infrastructure provider, who is the owner of the network and provides network slices corresponding to a certain fraction of network resources to the tenants, (ii) the tenants, which issue requests to the infrastructure provider to acquire network resources, and use these resources to serve their users, and finally (iii) the end-users, which are served by their tenant or operator and run their applications in the slice of their tenant.

According to a network model, the network is composed of a set of base stations B. For each base station b∈B, let $C_b$ denote the base station capacity. The system capacity is referred to as the sum of the capacity of all base stations, $C = \Sigma_B C_b$. Let U denote the set of users in the network. Each user u∈U in the system is associated to one base station b∈B, each of them with a nominal transmission rate $C_b$. $f_{ub}$ denotes the fraction of the resources of base station b assigned to user u, leading to a throughput for user u of $r_u = f_{ub} C_b$. It is also assumed that users are distributed among base stations with fixed probability $P_b$. Without loss of generality, unless otherwise stated, uniform distributions are assumed: that is, a given user u∈U is associated with base station b∈B with $P_b = 1/|B|$.

According to a network traffic model, elastic and inelastic traffic are considered. Let $\mathcal{I}$ denote the set of users that demand inelastic traffic, and ε the set of users that demand elastic traffic. Inelastic users required a certain fixed throughput demand $R_i$ which needs to be always satisfied with a fixed predetermined (small) outage probability $P_{out}$. In contrast to inelastic users, elastic users do not require any instantaneous throughput guarantees, but only average ones: they require that their expected average throughput over long time scales is above a certain threshold $R_e$. At any given point in time, the resources of each base stations are distributed among associated users as follows: inelastic users u∈$\mathcal{I}$ are provided sufficient resources to guarantee $r_u = R_i$, while the remaining resources are equally shared among the elastic users. In case there are not sufficient resources to satisfy the requirements of inelastic users, even when leaving elastic users with no throughput, we reject as many inelastic users as needed to satisfy the required throughput guarantees of the remaining ones.

According to a network slice model, the network is logically divided in different network slices, each of them belonging to a tenant. A network slice is characterized by (i) its traffic type (elastic or inelastic), and (ii) its number of users. When owning the corresponding network slice, a tenant is guaranteed that as long as he does not introduce more users than allowed by the slice size, its users will be provided with the service guarantees corresponding to their traffic type. While a network slice may be restricted to a certain geographical region (in which case the corresponding guarantees only apply to the users residing in the region), the focus in this discussion is on the general case in which network slices comprise the entire network.

In order to dynamically allocate network slices to tenants, tenants submit requests for network slices to the infrastructure provider, which may or may not accept these requests depending on the current load. Such network slices requests are characterized by: i) network slice duration t: this is the length of the time interval for which the network slice is requested; ii) traffic type κ: according to the traffic model above, the traffic type of a slice can either be elastic or inelastic traffic; iii) network slice size s: the size of the network slice is given by the number of users it should be able to accommodate; and iv) price ρ: the cost a tenant has to pay for acquiring resources for a network slice. The price is per time unit, and hence the total cost is given by r=ρt.

The infrastructure provider defines a given set of network slice classes, each of them with predefined values for {κ, s, ρ}. When requiring network resources, a tenant may issue a request for a slice of one of the available classes, indicating the duration t for which it wishes to use the slice. Upon receiving a request, the infrastructure provider needs to decide whether to admit it or not, depending on the network slices already admitted. For each class c of network slices, it is assumed that requests are issued following a Poisson process of rate $\lambda_c$ and t values follow an exponential random variable of rate $\mu_c$.

Upon receiving a network slice request, the infrastructure provider needs to decide whether to admit it or not. While the goal of the infrastructure provider when doing so is to maximize the revenue it gets from the network, it also needs to know whether admitting a certain request would infringe the guarantees provided to the already admitted requests; indeed, if that was the case, the new request would have to be rejected regardless of any revenue considerations. The different combination of requests that can be admitted while satisfying all traffic guarantees are referred to as the admissibility region A of the system. In the following, an analysis is provided to determine this admissibility region as a first step towards the design of an algorithm to maximize the infrastructure provider revenue.

Let |ε| be the number of elastic users in the system, and |$\mathcal{I}$| the number of inelastic users. A given combination of inelastic and elastic users belong to the admissibility region (i.e. {|$\mathcal{I}$|, |ε|}∈$\mathcal{A}$) when the guarantees identified for elastic and inelastic traffic are satisfied for such combination of users in the network.

In order to determine whether the combination {|$\mathcal{I}$|, |ε|} belongs to $\mathcal{A}$, the following procedure can be performed. Let $\mathcal{I}_b$ be the number of inelastic users associated to base station b. According to the system model, when a number of elastic and inelastic users are at a given base station, inelastic users are provided with a fixed throughput equal to $R_i$ independently of the number of elastic users in the base station. The only case in which they are not provided with this throughput is when the number of inelastic users itself is too large, i.e., when it exceeds $[C_b/R_i]$. Since (according to our inelastic traffic model) the probability that this happens cannot exceed $P_{out}$, the following constraint is provided:

$$P(r_u < R_i) = P\left(|\mathcal{I}_b| > \left\lfloor \frac{C_b}{R_i} \right\rfloor\right) \leq P_{out}, \quad u \in \mathcal{I}_b$$

According to the network model, users associate to base stations with a fixed probability 1/|B|, therefore the number of inelastic users at a base station follows a binomial distribution. Hence, the probability that this number exceeds a certain threshold can be computed from:

$$P\left(|\mathcal{J}_b| > \left\lfloor \frac{C_b}{R_i} \right\rfloor\right) = 1 - \sum_{j=0}^{\lfloor \frac{C_b}{R_i} \rfloor - 1} \binom{|\mathcal{J}|}{j} \left(\frac{1}{|B|}\right)^j \left(1 - \frac{1}{|B|}\right)^{|\mathcal{J}|-j}$$

Based on the above, the maximum number of inelastic users that can be admitted to the system, $I_{max}$, can be obtained from computing the largest $|\mathcal{J}|$ value that satisfies the following inequality:

$$1 - \sum_{j=0}^{\lfloor \frac{C_b}{R_i} \rfloor - 1} \binom{|\mathcal{J}|}{j} \left(\frac{1}{|B|}\right)^j \left(1 - \frac{1}{|B|}\right)^{|\mathcal{J}|-j} \le P_{out}$$

Note that $I_{max}$ is independent of the number of elastic users in the network: inelastic users preempt elastic ones and receive the same throughput independent of the number of elastic users present in the network.

Having computed the maximum number of inelastic users that can be admitted, the maximum admissible number of elastic users, $E_{max}$, is computed. In contrast to the previous case, in this case the throughput available to elastic users depends on the number of inelastic users, and hence $E_{max}$ will depend on the number of inelastic users admitted into the network, $\mathcal{J}$. A key approximation when computing $E_{max}$ will be to assume that the density of elastic users is sufficiently high so that the probability that there are no elastic users in a base station can be neglected. Note that, as elastic users consume as much throughput as possible, this assumption implies that the capacity of all base stations will always be fully used, i.e., $\Sigma_{u \in \mathcal{J} \cup \varepsilon} r_u = C$. Since inelastic users consume a fixed throughput equal to $R_i$, this yields $\Sigma_{u \in \varepsilon} r_u = C - |\mathcal{J}| R_i$ for elastic users. Over long time scales, all elastic users receive the same average throughput, and hence:

$$r_u = \frac{C - |\mathcal{J}| R_i}{|\varepsilon|}$$

If the constraint is imposed on the average throughput of an elastic users, $r_u \ge R_e$, and the maximum number of elastic users that can be admitted while satisfying this constraint is computed from the above equation, the following expression (which depends on the number of admitted inelastic users) is obtained:

$$E_{max}(|\mathcal{J}|) = \left\lfloor \frac{C - |\mathcal{J}| R_i}{R_e} \right\rfloor$$

From the above, the admissibility region A is given by all the combinations of inelastic and elastic users $\{|\mathcal{J}|, |E|\}$ that satisfy: (i) $|\mathcal{J}| \le I_{max}$; and (ii) $|\varepsilon| \le E_{max}(|\mathcal{J}|)$. This terminates the analysis of the admissibility region.

In order to evaluate the above analysis, the admissibility region obtained theoretically was compared against one resulting from simulations. To this end, the scenario of ITU-T (see ITU-R, "Guidelines for evaluation of radio interface technologies for IMT-advanced, which is hereby incorporated by reference herein) was considered, which consists of $|B|=19$ base stations placed at a fixed distance of 200 m. Users move in this area covered by these base stations following the Random Waypoint (RWP) mobility model, with a speed uniformly distributed between 2 and 3 m/s.

The association procedure of elastic and inelastic users with base stations is as follows. Inelastic users $u \in \mathcal{J}$ try to attach to the nearest base station $b \in B$, if it has at least $R_i$ capacity left. Otherwise they do not associate and generate an outage event, joining again the network when their throughput guarantee can be satisfied. When associating, they consume a capacity $R_i$ from the base station. Similarly, elastic users always associate to the nearest base station. All the elastic users associated with a base station, $u \in \varepsilon_b$, fairly share among them the capacity left over by inelastic users. Upon any association event, the throughput received by the users associated to the new and the old base station changes accordingly.

Following the above procedure, all the possible combinations of inelastic and elastic users, $\{\mathcal{J}, \varepsilon\}$ were simulated. For each combination, the following were evaluated: average throughput received by elastic users, computed over samples of 10 seconds time windows, and the outage probability $P_{out}$ of inelastic users, computed as the fraction of time over which they do not enjoy their guaranteed throughput. If these two metrics (average elastic traffic throughput and inelastic traffic outage probability) are within the guarantees provided to the two traffic types, this combination was placed inside the admissibility region, and otherwise it was placed outside.

Figure 8:
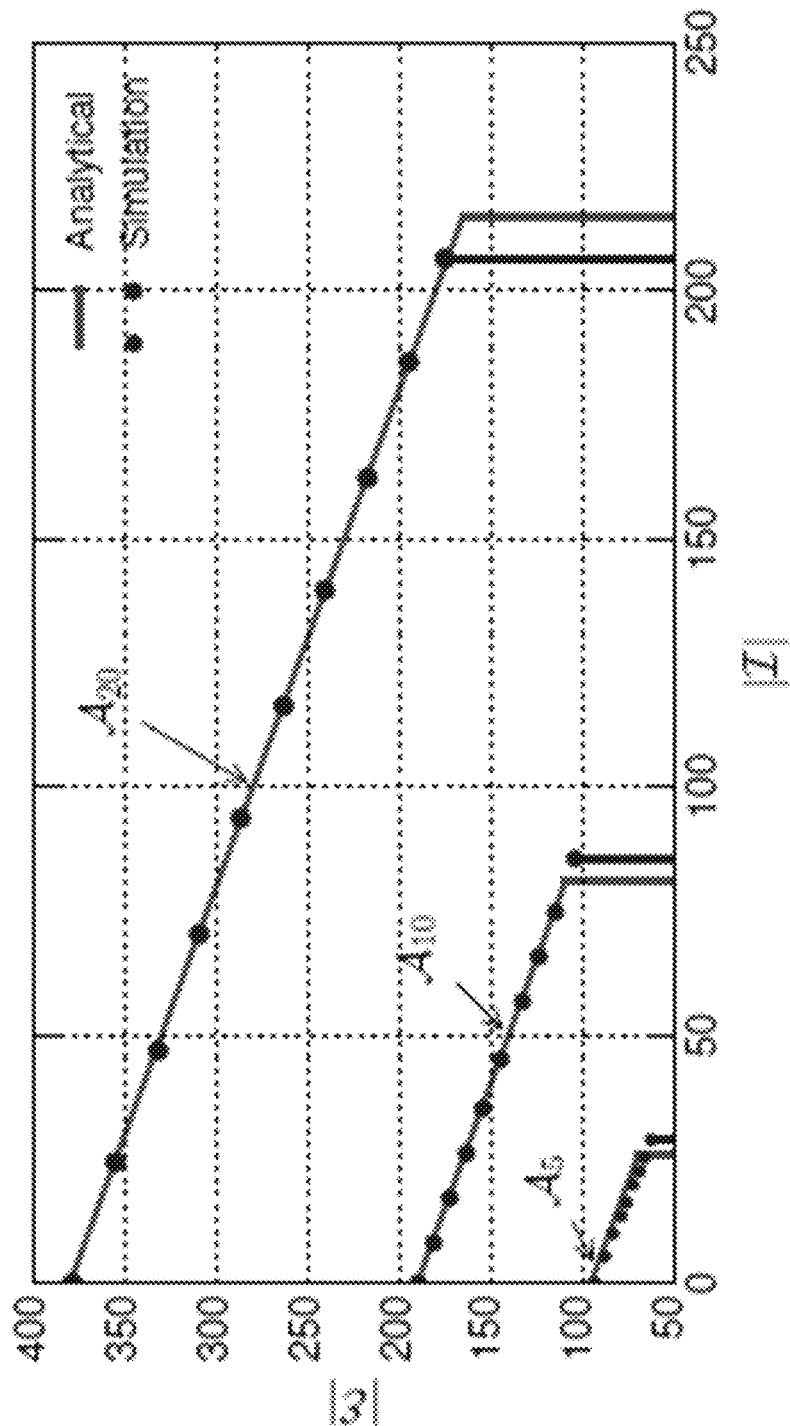
FIG. 8 schematically illustrates a computed admission region against a simulation.

FIG. 8 shows the boundaries of the admissibility region obtained analytically and via simulation, respectively, for different throughput guarantees for elastic and inelastic users ($\mathcal{A}_5$: $R_i = R_e = C_b/5$, $\mathcal{A}_{10}$: $R_i = R_e = C_b/10$ and $\mathcal{A}_{20}$: $R_i = R_e = C_b/20$) and $P_{out} = 0.01$. It was observed that simulation results closely match analytical ones, which confirms the accuracy of the analysis. It was further observed that the admissibility region is limited by the most restrictive of the following conditions: (i) the maximum number of inelastic users that can be admitted, and (ii) the sum of inelastic and elastic users, which has to be below a maximum number as well. In FIG. 8, the simulation represented by dots ends along the x-axis at the line extending downward from the final dot appearing along the x-axis ($|\mathcal{J}|$) from left to right.

While the admissibility region computed above provides the maximum number of elastic and inelastic users that can be admitted, an optimal admission algorithm that aims at maximizing the revenue of the infrastructure provider may not always admit all the requests that fall within the admissibility region. When the network is close to congestion, admitting a request that provides a lower revenue may prevent the infrastructure provider from admitting a future request with a higher revenue associated. Therefore, the infrastructure provider may be better off by rejecting the first request with the hope that a more profitable one will arrive in the future.

To analyze the revenue obtained by the infrastructure provider, the system can be modeled as a SMDP). For simplicity, the system is first modeled for the case in which there are only two classes of slice requests of fixed size s=1, i.e., for one elastic user or for one inelastic user. Later on, it is shown how the model can be extended to include an arbitrary set of network slice requests of different sizes.

As discussed above, Markov Decision Process theory models a system as: (i) a set of states $s \in S$, (ii) a set of actions a∈A, (iii) a transition function P(s, a, s'), (iv) a time transition function T(s, a), and (v) a reward function R(s, a). At each event, the system can be influenced by taking one of the possible actions a∈A. According to the chosen actions, the system earns the associated reward function R(s, a), the next state is decided by P(s, a, s') while the transition time is defined by T(s, a).

The inelastic and elastic network slices requests follow two Poisson processes $\mathcal{P}_i$ and $\mathcal{P}_e$ with associated rates of $\lambda_i$ and $\lambda_e$, respectively. When admitted into the system, the slices occupy the system resources according to an exponentially distributed time of average $$\frac{1}{\mu_i} \text{ and } \frac{1}{\mu_e}.$$

Additionally, they generate a revenue per time unit for the infrastructure provider of $\rho_i$ and $\rho_e$. That is, the total revenue r generated by an e.g., elastic request with duration t is $t\rho_e$.

Figure 9:
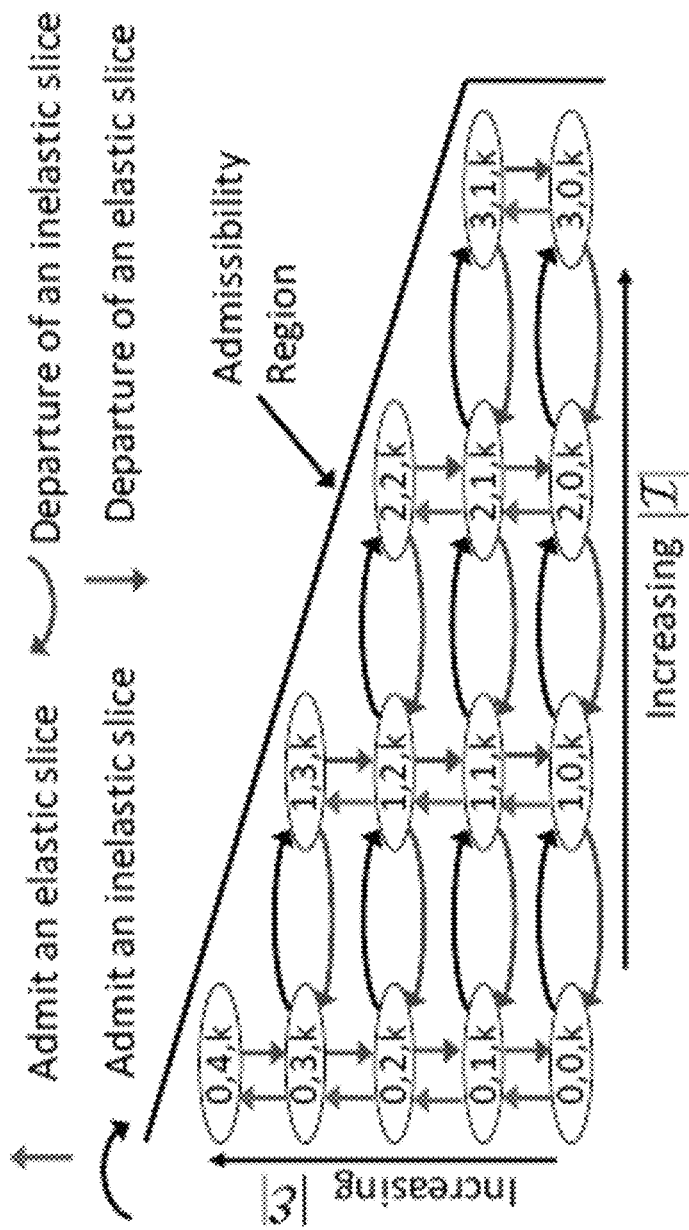
FIG. 9 graphically shows a system model with different states.

The space state S is defined as follows. A state s∈S is a three-sized tuple $(n_i, n_e, k | n_i, n_e \in \mathcal{A})$ where $n_i$ and $n_e$ are the number of inelastic and elastic slices in the system at a given decision time t, and k∈{i, e, d} is the next event that triggers a decision process. This can be either a new arrival of a network slice request for inelastic and elastic slices (k=i and k=e, respectively), or a departure of a network slice of any kind that left the system (k=d). In the latter case, $n_i$ and $n_e$ represent the number of inelastic and elastic slices in the system after the departure. FIG. 9 shows how the space state S relates to the admissibility region $\mathcal{A}$.

The possible actions a∈A are the following: A=G, D. The action G corresponds to admitting the new request of an elastic or inelastic slice; in this case, the resources associated with the request are granted to the tenant and the revenue $r=\rho_{i,e}t$ is immediately earned by the infrastructure provider. In contrast, action D corresponds to rejecting the new request; in this case, there is no immediate reward, but the resources remain free for future requests. Note that upon a departure (k=d), the system is forced to a fictitious action D that involves no revenue. Furthermore, it is forced that upon reaching a state in the boundary of the computed admissibility region, the only available action is to reject an incoming request (a=D) as otherwise the committed guarantees would not be met. Requests that are rejected are lost forever.

The transition rates between the states identified above are derived next. Transitions to a new state with k=i and k=e happen with a rate $\lambda_i$ and $\lambda_e$, respectively. Additionally, states with k=d are reached with a rate $n_i\mu_i + n_e\mu_e$ depending the number of slices already in the system. Thus, the average time the system stays at state s, T(s, a) is given by:

$$T(s, a) = \frac{1}{v(n_i, n_e)}$$

where $n_i$ and $n_e$ are the number of inelastic and elastic slices in states and $v(n_i, n_e) = \lambda_i + \lambda_e + n_i\mu_i + n_e\mu_e$.

We define policy π(S), π(s)∈A is defined, as a mapping from each state s to an action A. Thus, the policy determines whether, for a given number of elastic and inelastic slices in the system, to admit a new request of an elastic or an inelastic slice. With the above analysis, given such a policy, the probability of staying at each of the possible states can be computed. Then, the long term average revenue R obtained by the infrastructure provider can be computed as:

$$R = P(n_i, n_e, k)(n_i\rho_i + n_e\rho_e)$$

where $\rho_i$ and $\rho_e$ are the price per time unit paid by an inelastic and an elastic network slice, respectively.

An ultimate goal is to find a policy π(S) that maximises the long term average revenue. In order to derive the optimal policy, the value iteration approach can be built upon and used. According to the revenue analysis, the system has the following transition probabilities P(s, a, s').

For a=D, ∀s:

$$P(s, a, s') = \begin{cases} \frac{\lambda_i}{v(n_i, n_e)}, & s' = (n_i, n_e, i) \\ \frac{\lambda_e}{v(n_i, n_e)}, & s' = (n_i, n_e, e) \\ \frac{n_i\mu_i}{v(n_i, n_e)}, & s' = (n_i - 1, n_e, d) \\ \frac{n_e\mu_e}{v(n_i, n_e)}, & s' = (n_i, n_e - 1, d) \end{cases}$$

For a=G, s=(Xn$_i$,n$_e$,i):

$$P(s, a, s') = \begin{cases} \frac{\lambda_i}{v(n_i + 1, n_e)}, & s' = (n_i + 1, n_e, i) \\ \frac{\lambda_e}{v(n_i + 1, n_e)}, & s' = (n_i + 1, n_e, e) \\ \frac{(n_i + 1)\mu_i}{v(n_i + 1, n_e)}, & s' = (n_i, n_e, d) \\ \frac{n_e\mu_e}{v(n_i + 1, n_e)}, & s' = (n_i + 1, n_e - 1, d) \end{cases}$$

For=G, s=(n$_i$,n$_e$,e):

$$P(s, a, s') = \begin{cases} \frac{\lambda_i}{v(n_i, n_e + 1)}, & s' = (n_i, n_e + 1, i) \\ \frac{\lambda_e}{v(n_i, n_e + 1)}, & s' = (n_i, n_e + 1, e) \\ \frac{n_i\mu_i}{v(n_i, n_e + 1)}, & s' = (n_i - 1, n_e + 1, d) \\ \frac{(n_e + 1)\mu_e}{v(n_i, n_e + 1)}, & s' = (n_i, n_e, d) \end{cases}$$

Similarly, the reward function R(s, a) is given by:

$$R(s, a) = \begin{cases} 0, & a = D \\ t\rho_{i,e} & a = G \end{cases}$$

Applying the value iteration algorithm (see FIG. 6) for SMDP is not straightforward. The standard algorithm cannot be applied to a continuous time problem as it does not consider variable transition times between states. Therefore, in order to apply value iteration to the system, an additional step is provided: all the transition times are normalized as multiples of a faster, arbitrary, fixed transition time i that is faster than any other transition time in the system, which leads to:

$$\tau < \min T(s,a), \forall s \in S, \forall a \in A$$

With the above normalization, the continuous time SMDP corresponding to the analysis of the previous section becomes a discrete time Markov Process and the modified value iteration algorithm may be used to devise the best policy π(S). The discretised Markov Chain will hence be composed of transitions (at intervals of τ) that may correspond to transitions in continuous time system or not.

The normalization procedure affects the update rule of step 2 in the value iteration algorithm. All the transition probabilities P(s, a, s') are scaled by a by a factor $$\frac{\tau}{T(s, a')}$$

making them time-independent. Also, the revenue R(s, a) is scaled by a factor of T(s, a) to take into account the transitions in the sampled discrete time system that do not correspond to transitions in the continuous time one. This fact is also taken into account in the last term of the equation (i.e., in case of a fictitious transition, keep $V_n(s)$).

Figure 10:
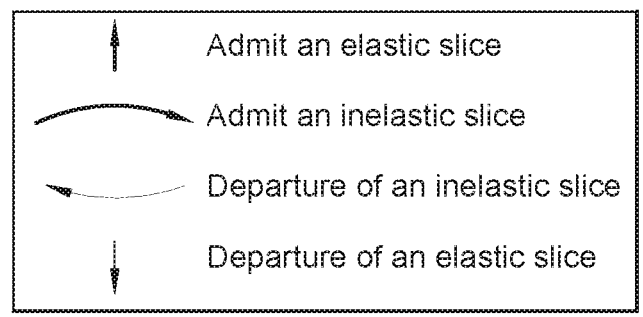
FIG. 10 graphically shows an example of an operation of an optimal policy for elastic and inelastic slices.
Figure 10:
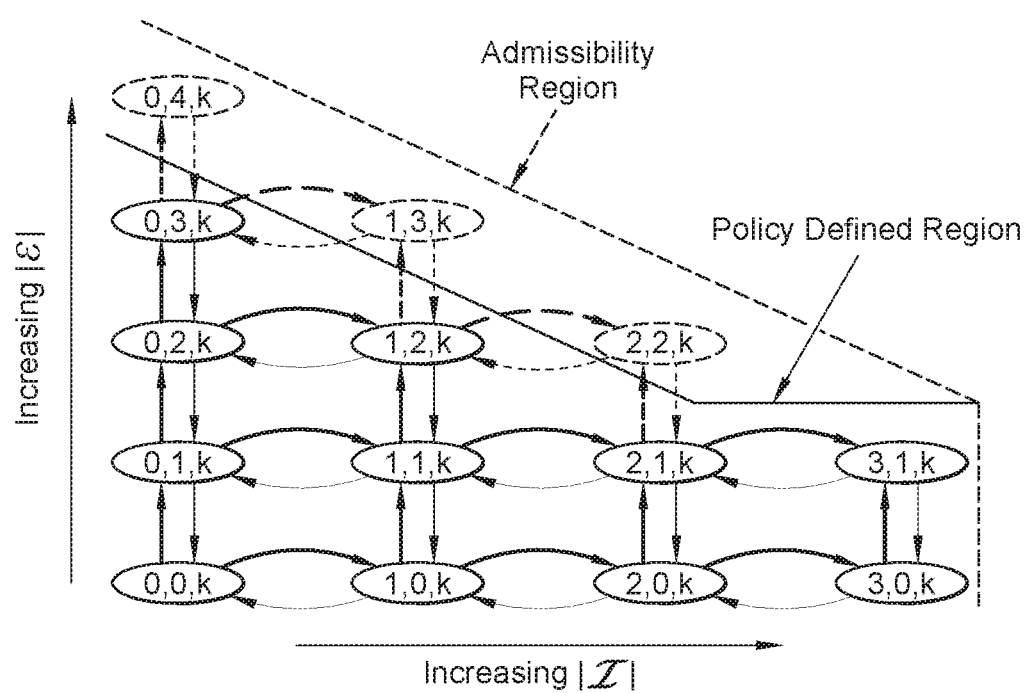

The value iteration algorithm is guaranteed to find the optimal policy π(S). Such an optimal policy is illustrated in FIG. 10 for the case where the price of inelastic slice is higher than that of elastic slice ($\rho_i > \rho_e$). FIG. 10 shows those states for which the corresponding action is to admit the new request (solid line), and those for which it is to reject it (dashed lines). It can be observed that while some of the states with a certain number of elastic slices fall into the admissibility region, the system is better off rejecting those requests and waiting for future (more rewarding) requests of inelastic slice. In contrast, inelastic slice requests are always admitted (within the admissibility region).

The analysis described is for network slice requests of size one. In order to extend the analysis to requests of an arbitrary size, the following procedure can be used. The space state is set to account for the number of slices of each different class in the system (where each class corresponds to a traffic type and a given size). Similarly, the transition probabilities P(s, a, s') are computed corresponding to arrival and departures of different classes (given the arrival rate of each class). With this, it is possible to apply the same procedure as above (over an extended space state) to obtain the optimal policy.

It has been shown that: (i) the value iteration algorithm converges to a certain policy, and (ii) the policy to which the algorithm converges performs arbitrarily close to the optimal policy. Theorem 6.6.1 in H. Tijm, "A first course in stochastic models," J. Wiley & Sons (2003) proves that the policy π(S) obtained using value iteration algorithm provides a long-run average reward $g_s(\pi(S))$ that is arbitrarily bounded by an E value when compared to the optimal one g*. Thus:

$$0 \le \frac{g^* - g_s(\pi(S))}{g_s(\pi(S))} \le \frac{M_n - m_n}{m_n} \le \epsilon, \quad \forall s \in S$$

The convergence of the value iteration algorithm is guaranteed by the third term of the inequality above, that acts as a decreasing envelope of the second term, as shown by Theorem 6.6.3 in H. Tijm, "A first course in stochastic models," J. Wiley & Sons (2003):

$$m_{n+1} \ge m_n, M_{n+1} \le M_n, \forall n \ge 1$$

By applying step 3) of the value iteration algorithm (see below), the obtained π(S) is ∈-bounded to the optimal. While the aforementioned Theorems solve a cost minimisation problem, they have been adapted to the revenue maximization scenario. E is preferably chosen to be a very small value, for example, it is empirically set ϵ=0.001, and such value is used for the examples discussed herein.

In view of the value iteration algorithm updating all the V values V(s), s∈S at each step, the running time grows steeply with the size of the state space, and may become too high for large scenarios. Building on the analysis described above, a further embodiment is provided which has reduced computational cost. According to this embodiment, an adaptive algorithm is designed that aims at maximizing revenue by learning from the outcomes resulting from the previous decisions. As discussed above, the adaptive algorithm is based on the Q-Learning framework. The algorithm constantly learns the characteristics of the system by exploring it and taking decisions.

According to an embodiment of the present invention, the Q-Learning framework builds on the SMDP-based system model. The Q-Learning space state is similar to the one of the SMDP model:

$$(n^*_i, n^*_e, k|o(n^*_i, n^*_e) \in \mathcal{A})$$

where $n^*_i$ and $n^*_e$ are defined as a n-dimension tuples ($n_1$, $n_2$, . . . , $n_c$) describing the number of slices of different sizes in the system for inelastic and elastic traffic types. Analogously, o is the occupation of the system, and k∈{i*, e*} where i* and e* are the sets of events associated wo an arrival of an inelastic or elastic slice request of a given size.

According to the Q-Learning framework, Q(s, a) denotes the expected reward resulting from taking an action a at a certain state s. The system keeps memory for each state of Q(s, a). It starts with empty $Q_0$(s, a) and at the decision step n it takes an action a based on the past estimations of Q(s, a). Hence, the system experiences a transition from state s at the decision step n, to state s' at decision step n+1. Then, once in step n+1, the algorithm has observed both the reward obtained during the transition R(s, a) and a sample $t_n$ of the transition time. The, the algorithm updates the Q(s, a) involved in the decision process at step n using the newly gathered reward and transition time information. After a learning phase, the optimal admission policy at a certain state will be the one that maximizes the resulting expected revenue, i.e.:

$$V(s) = \max_{a \in A} Q(s, a)$$

In addition to the above, some other features and advantages of Q-Learning include the following: (i) as the system is not sampled anymore, all transitions are triggered by an arrival event and the subsequent decision a∈A, (ii) transition times and rewards depend on the landing state s', as the algorithm can actually record the transition time $t_n$ and the reward obtained after taking the decision a in state s, and (iii) as Q-values are expected average rewards for taking an action a while in a given state s, the current average reward of the system a is used as reference value to know whether the action a taken in state s actually improves the revenue of the system or not.

An especially advantageous and remarkable property of the resulting Q-Learning framework is that the optimization of the action selection can be model-free, as the Q-values can be updated online without making any assumptions on the underlying stochastic process.

The Q-Learning algorithm maintains the Q-values which are updated iteratively following a sample-based approach as described in the Q-learning update procedure (see FIG. 7), in which new events are evaluated at the time when they happen. In addition to the procedure to update the Q-values, the Q-Learning algorithm also relies on two other procedures: the TD-learning and exploration—exploitation procedures. TD-learning ensures the convergence of the algorithm by employing the α parameter, which is the learning rate. The requirements for setting α are two: (i) $\Sigma_{n=0}^{\infty} \alpha_n = \infty$ and (ii) $\Sigma_{n=0}^{\infty} \alpha_n^2 < \infty$ (these requirements imply that $\alpha_n$ is a descending sequence). The Q-values update process in step 4 of the Q-learning update procedure needs to build a correct estimation (using the exponential average) of the expected revenue obtained by choosing an action a while in state s. Ideally, new samples ω (with more updated information) should be weighted by a larger weight than the estimation built on all the past samples Q(s, a), especially if the first exploration steps did not provide a good result (more details are provided next). On the other hand, $\alpha_n$ coefficients have to be tore down as the expected reward for each pair s, a is set to constantly grow over time. When setting α according to the above requirements, the following additional considerations are relevant: too slowly descending α sequences will delay the convergence of the algorithm, but too fast ones may make the algorithm unaware of new choices too soon. Based on all these requirements and considerations, it is set $$\alpha = \frac{0.5}{\eta(s, a)},$$

where η(s, a) is the number of times the action a was selected, being in state s. That is, the learning rate heterogeneously decreases over time according to the experienced s, a transition.

Exploration-exploitation drives the selection of the best action to be taken at each time step. While choosing the action a that maximises the revenue at each step contributes to maximising the overall revenue (i.e., exploitation step), it is also necessary to visit new (still unknown) states even if this may lead to a suboptimal revenue (i.e., exploration step). The reason for this is that the algorithm needs to explore all possible (s, a) options in order to evaluate the impact of the different decisions. The trade-off between exploitation and exploration is regulated by the γ parameter. Herein, it is set γ=0.1 in order to force that sometimes the wrong decision is taken and thus all possible options are learnt, which ultimately improves the accuracy of the algorithm. The impact of taking wrong choices is dampened by the constantly decreasing $\alpha_n$ values, up to the point in which taking wrong decisions has no impact on the policy generation process as the algorithm visited a state s a sufficiently large amount of times so that it learnt the best Q-value.

According to an embodiment, one or more computer processors are configured to perform the value iteration algorithm including the steps of:

1) Initialize the vector V(s)=0, ∀s∈S. V(s) represents the long term expected revenue for being in state s. Initialize the step number n to 1.
2) Update the expected reward at time n+1, $V_{n+1}(s)$ using the rule:

$$V_{n+1}(s) = \max_{a \in A}\left[\frac{R(s, a)}{T(s, a)} + \frac{\tau}{T(s, a)}\sum_{s'} P(s, a, s')V_n(s') + \left(1 + \frac{\tau}{T(s, a)}\right)V_n(s)\right] \quad \forall s \in S$$

3) Compute the boundaries:

$$M_n = \max_{s \in S}(V_{n+1}(s) - V_n(s))$$
$$m_n = \min_{s \in S}(V_{n+1}(s) - V_n(s))$$

and check the condition:

$$0 \le (M_n - m_n) \le \epsilon m_n$$

4) If the condition in step 3) is not fulfilled, then repeat from step 2).

FIG. 6 illustrates an exemplary flow of the value iteration algorithm. In a step S-1A, the vector V(s) is initialized. In a step S-1B, the step number n is initialized to 1. In a step S-1C, the expected reward for a given time is updated. In a step S-1D, the boundaries are computed and in a step S-1E it is checked whether the condition of being ∈-bounded is fulfilled. If the condition is fulfilled, the optimal policy can be determined in step S-1F. Otherwise, the algorithm returns to step S-1C.

According to another embodiment, one or more computer processors are configured to perform the Q-learning update procedure including the steps of:

1) Initialize the vector Q(s, a)=0, ∀s∈S, a∈A.
2) An event is characterized by: (s, a, s', r, t) (the starting state, the action taken, the landing state, the obtained reward and the transition time).
3) Update the old estimate Q(s, a) with the new sample observation as follows:

$$\omega = R(s, a, s') - \sigma t_n + \max_{a'} Q(s', a')$$

where $t_n$ is the transition time between two subsequent states s and s' after action a.

4) Integrate the new sample in a running exponential average estimation of Q(s, a):

$$Q(s, a) = (1 - \alpha)Q(s, a) + \alpha \omega$$

FIG. 7 illustrates an exemplary flow of the Q-learning update procedure. In a step S-2A, the vector Q(s,a) representing expected reward resulting from action a at state s is initialized. In a step S-2B, an event is characterized by starting state s, action taken a, landing state s', obtained reward r and transition time t. Using these parameters, the estimate of the reward is updated in a step S-2C. In a step S-2D, this updated estimate of the reward is used to update a running exponential average estimate of the expected reward.

In the second embodiment, using Q-learning, past information including previous payoffs and resource utilization based on other SLAs having requirements comparable to the SLA is considered to determine whether to accept the network slice request. The first embodiment using the iterative value (based on Markovianity property) just considers the last step as it is a memory-less solution.

In the following, the performance of the embodiments discussed above were evaluated via simulation to recognize the gains achieved in the network performance. Unless otherwise stated, a scenario was considered with four slice classes, two for elastic traffic and two for inelastic. μ=5 for all network slices classes, and the arrival rates equal to $\lambda_i=2\mu$ and $\lambda_e=10\lambda_i$ for the elastic and inelastic classes, respectively. Two network slice sizes were considered, equal to C/10 and C/20, where C is the total network capacity. Similarly, the throughput required guarantees for elastic and inelastic traffic to $R_i=R_e=C_b/10$. Two key parameters employed throughout the performance evaluation are $\rho_e$ and $\rho_i$, the average revenue per time unit generated by elastic and inelastic slices, respectively (in particular, performance depends on the ratio between them).

The admission policy resulting from the optimal algorithm for different ratios between $\rho_i$ and $\rho_e$ was first analyzed. Note that, given that inelastic traffic is more demanding, it is reasonable to assume that it pays a higher price than elastic traffic $\rho_i \geq \rho_e$ As inelastic traffic provides a higher revenue, in order to maximise the total revenue, the infrastructure provider will always admit inelastic network slice requests. In contrast, it is to be expected that, while elastic traffic requests will be admitted when the utilization is low, they may be rejected with higher utilizations in order to avoid losing the opportunity to admit future (and more rewarding) inelastic requests. Furthermore, it is to be expected that this behavior will be exacerbated as the $\rho_i/\rho_e$ grows larger.

Figure 11:
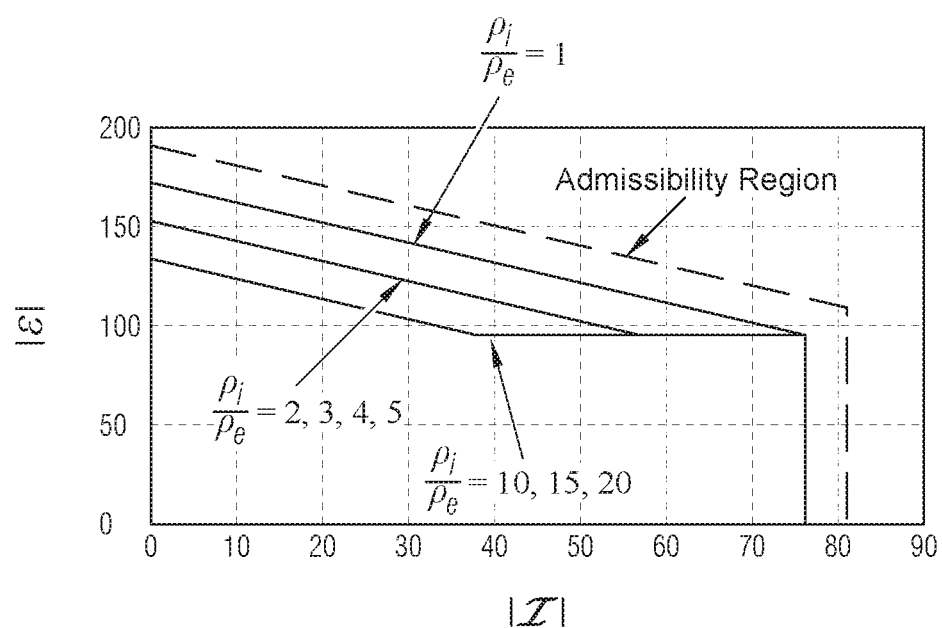
FIG. 11 graphically shows an optimal admission policy for elastic traffic.

The optimal admission policy for elastic traffic resulting from the algorithm is shown in FIG. 11. As expected, it is observed that the region corresponding to the admission of elastic network slices requests is smaller than the admissibility region, implying that the method is more restrictive in the admission of elastic traffic. Furthermore, and also as expected, this region becomes smaller for larger $\rho_i/\rho_e$ ratios, thus confirming the optimal admission policy.

Figure 12:
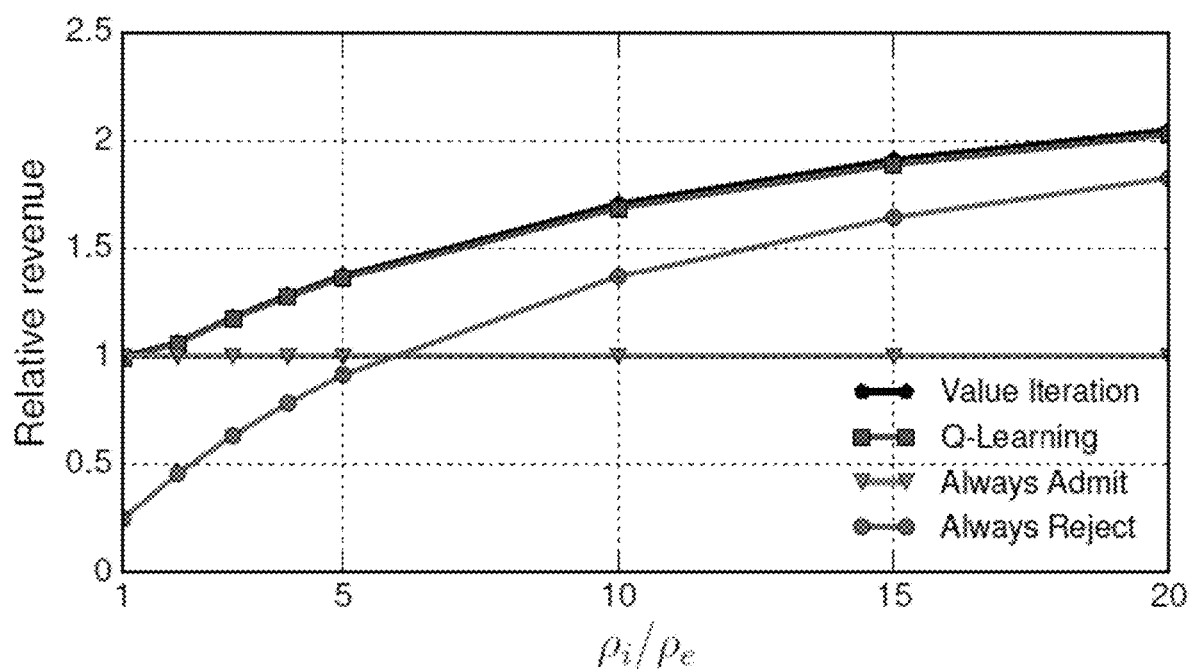
FIG. 12 graphically shows how the different policies perform against one another with respect to revenue as the utility function.

The performance of the adaptive algorithm was evaluated by comparing it against: (i) the benchmark provided by the optimal algorithm, and (ii) two naive policies that always admit elastic traffic requests and always reject them, respectively. FIG. 12 shows the relative average reward obtained by each of the policies, taking as baseline the policy that always admits all network slice requests. It can be seen that the adaptive algorithm performs very closely to the optimal policy, despite providing a number of advantages over the optimal policy such as computational cost and speed. It is further observed that the revenue improvements over the naive policies is very substantial, up to 100% in some cases. As expected, for small $\rho_i/\rho_e$ the policy that always admits all requests is optimal, as in this case both elastic and inelastic slices provide the same revenue; in contrast, for very large $\rho_i/\rho_e$ ratios the performance of the "always reject" policy improves, as in this case the revenue obtained from elastic traffic is (comparatively) much smaller.

Thus, the results show that the adaptive algorithm performs close to optimal and that the optimal algorithm and the adaptive algorithm each perform significantly better than the two naive policies. Moreover, the results do not fully demonstrate the gains that would be achieved by using the adaptive algorithm for different utility functions and/or goals, thereby achieving smarter and more flexible policies, while not being completely optimal can be tailored to the different utility functions and/or goals. To this end, the performance of the adaptive algorithm was compared against a set of "smart" random policies defined as: inelastic network slices requests are always accepted (k=i⇒a=G), while the decision of rejecting an elastic request (k=e⇒a=D) is set randomly. Then, by drawing a high number of random policies, it is to be expected that some of them provide good performance.

Figure 13:
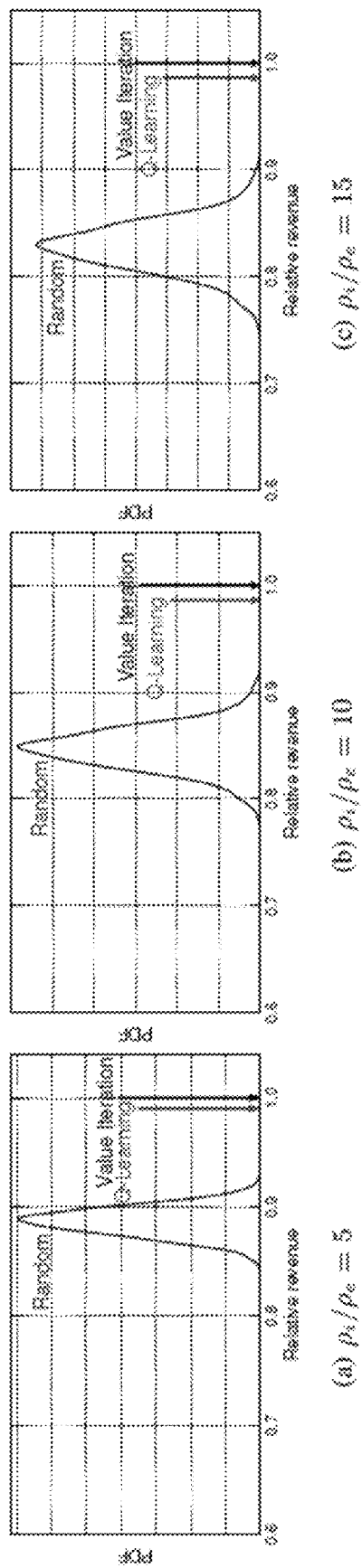
FIG. 13 graphically shows the results of revenue obtained by smart policies in comparison to embodiments of the present invention.

FIG. 13 shows the comparison against 1,000 different random policies. The results confirm that: (i) none of the random policies outperforms the approach using the adaptive algorithm, further confirming the optimality of the approach, and (ii) substantial gains (around 20%) are obtained over the random policies. These results confirm that a smart heuristic is not as effective, and very substantial gains can be achieved by using a close to optimal policy with the adaptive algorithm.

The previous results have assumed that: (i) arrivals and departures follow Poisson process with exponential times, and (ii) the optimal algorithm has a perfect estimation of the statistics of this process. In the following, a case is addressed in which neither of these assumption holds. Two modifications are introduced: (i) arrivals and departures are Pareto-distributed, and (ii) the real arrival process $\hat{\lambda}$ is let to deviate from the estimate on $\lambda$:

$$\hat{\lambda}(j) = \frac{\lambda}{j+1}$$

as a function of a parameter j>−1. That is, the optimal policy obtained by value iteration under the original assumptions is computed offline, with the estimated parameter, and applied to the real system. Note that for negative j values, the system receives a number of request per time unit higher than the estimated $\lambda$, while positive j values indicate a lower requests arrival rate.

Figure 14:
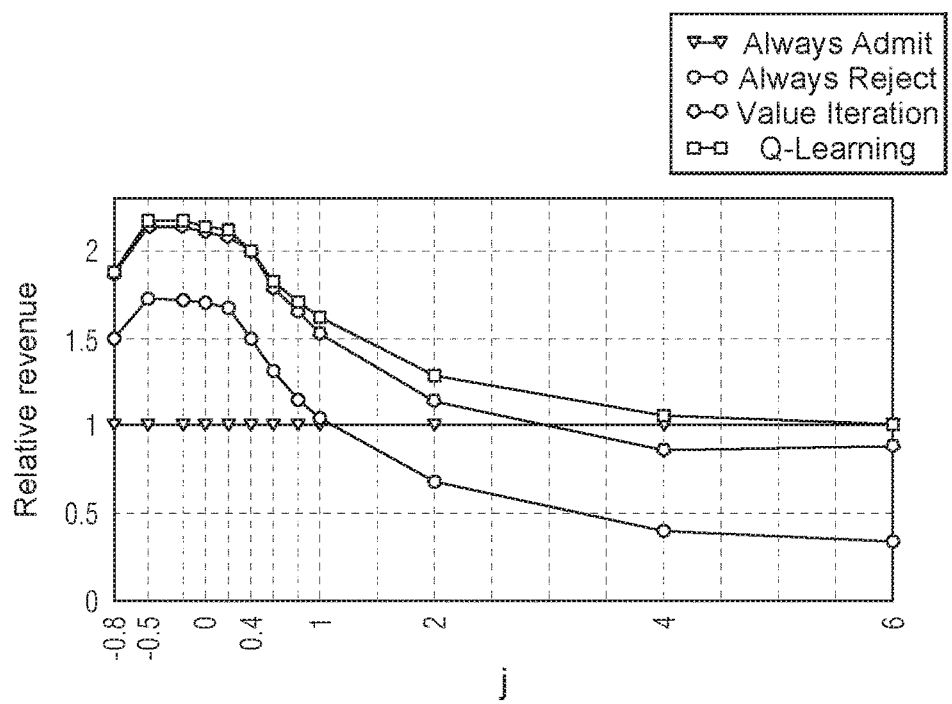
FIG. 14 graphically shows results of revenue achieved with the different policies in a perturbed scenario.

The results, depicted in FIG. 14, show that the adaptive algorithm, which automatically learns the network slice behaviour on the fly and hence is not affected by possible estimation errors, substantially outperforms the optimal policy built upon flawed assumptions and estimations. It is worth noting that the adaptive algorithms performs better than the optimal policy even without estimation errors (j=0): this is due to the fact that the optimal policy assumes Poisson arrivals and departures, and thus its performance is affected by the Pareto nature of the distributions. In contrast, the adaptive algorithm is model-free: it learns the actual statistics of the system and does not see its performance degraded. This is an especially advantageous improvement as it relieves the infrastructure provider from estimating network slicing statistics, reducing thusly the number of parameters to be configured and simplifying network operation. Additionally, the adaptive algorithm also outperforms substantially the two naive policies.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of allocating network slices of a network infrastructure, the method comprising:
   receiving a network slice request for network resources of the network infrastructure in a form of a network slice, the network slice request including a service level agreement (SLA) and an associated payoff;
   determining whether to accept the network slice based on whether it is expected that a utility function will be better served by accepting the network slice request or waiting for a further network slice request, wherein the determination takes into account SLA multiplexing properties and a prediction of whether a further SLA of the further network slice will provide a higher or lower associated payoff;
   determining whether the SLA would be fulfilled prior to allocating the network slice;
   allocating the network slice; and
   installing the network slice in the network infrastructure.

2. The method according to claim 1, wherein a value iteration algorithm or an adaptive algorithm is used to determine whether the utility function will be better served by accepting the network slice request or waiting for a further network slice request.

3. The method according to claim 2, wherein the adaptive algorithm is used to determine whether to accept the network slice request, the adaptive algorithm being based on a Q-learning framework.

4. The method according to claim 3, wherein the adaptive algorithm maintains Q-values which are iteratively updated based on new events and uses temporal difference learning, and exploration and exploitation procedures.

5. The method according to claim 4, wherein past information including previous payoffs and resource utilization based on other SLAs having requirements comparable to the SLA is considered to determine whether to accept the network slice request.

6. The method according to claim 2, wherein the value iteration algorithm is used to determine whether to accept the network slice request, the method further comprising determining transition probabilities based on a Semi-Markov Decision Process and normalizing transition times as multiples of a faster, fixed transition time so as to form a discretized Markov chain.

7. The method according to claim 1, wherein the utility function is overall network resource utilization.

8. The method according to claim 1, wherein the utility function is overall system revenue.

9. The method according to claim 1, wherein the method is performed by a network slice controller disposed in a mobile network architecture, the network slice controller utilizing a network exposure function (NEF) for receiving the network slice request from an infrastructure tenant.

10. The method according to claim 1, wherein the network slice is elastic, and wherein the determination of whether to accept the network slice includes determining whether it is expected that waiting for another network slice request for a network slice that is inelastic will better serve the utility function.

11. The method according to claim 1, wherein past information including previous payoffs and resource utilization based on other SLAs having requirements comparable to the SLA is considered to determine whether to accept the network slice request.

12. A network slice controller for allocating network slices of a network infrastructure, the network slice controller comprising one or more processors which, alone or in combination, are configured to provide for performance of the following steps:
   receiving a network slice request for network resources of the network infrastructure in a form of a network slice, the network slice request including a service level agreement (SLA) and an associated payoff;
   determining whether to accept the network slice based on whether it is expected that a utility function will be better served by accepting the network slice request or waiting for a further network slice request, wherein the determination takes into account SLA multiplexing properties and a prediction of whether a further SLA of the further network slice will provide a higher or lower associated payoff;
   determining whether the SLA would be fulfilled prior to allocating the network slice;
   allocating the network slice; and
   installing the network slice in the network infrastructure.

13. The network slice controller according to claim 12, being further configured to use a value iteration algorithm or an adaptive algorithm to determine whether the utility function will be better served by accepting the network slice request or waiting for a further network slice request.

14. The network slice controller according to claim 13, wherein the adaptive algorithm is used to determine whether to accept the network slice request, the adaptive algorithm being based on a Q-learning framework, and wherein the adaptive algorithm maintains Q-values which are iteratively updated based on new events and uses temporal difference learning, and exploration and exploitation procedures.

15. The network slice controller according to claim 14, wherein past information including previous payoffs and resource utilization based on other SLAs having requirements comparable to the SLA is considered to determine whether to accept the network slice request.

16. The network slice controller according to claim 12, wherein the network slice controller is disposed in a mobile network architecture, the network slice controller utilizing a network exposure function (NEF) for receiving the network slice request from an infrastructure tenant.

17. The network slice controller according to claim 12, wherein past information including previous payoffs and resource utilization based on other SLAs having requirements comparable to the SLA is considered to determine whether to accept the network slice request.

* * * * *